(12) United States Patent
Ozugur et al.

(10) Patent No.: US 8,701,017 B2
(45) Date of Patent: Apr. 15, 2014

(54) SYSTEM AND METHOD FOR REPRESENTATION OF PRESENTITY PRESENCE STATES FOR CONTACTS IN A CONTACT LIST

(75) Inventors: Timucin Ozugur, Fairview, TX (US); Jack Jachner, Lexington, MA (US)

(73) Assignee: Alcatel Lucent, Paris (FR)

( * ) Notice: Subject to any disclaimer, the term of this patent is extended or adjusted under 35 U.S.C. 154(b) by 2097 days.

(21) Appl. No.: 11/463,928

(22) Filed: Aug. 11, 2006

(65) Prior Publication Data

US 2007/0121867 A1   May 31, 2007

Related U.S. Application Data

(63) Continuation-in-part of application No. 11/282,144, filed on Nov. 18, 2005, now Pat. No. 7,941,752.

(60) Provisional application No. 60/738,296, filed on Nov. 18, 2005.

(51) Int. Cl.
*G06F 3/0482* (2013.01)

(52) U.S. Cl.
USPC ............ 715/751; 709/246; 709/231; 709/227

(58) Field of Classification Search
USPC .......................... 709/203–207, 246; 715/751
See application file for complete search history.

(56) References Cited

U.S. PATENT DOCUMENTS

| | | | | |
|---|---|---|---|---|
| 5,497,373 A | * | 3/1996 | Hulen et al. .................. | 370/259 |
| 6,463,078 B1 | * | 10/2002 | Engstrom et al. ............. | 370/466 |
| 6,535,486 B1 | * | 3/2003 | Naudus et al. ................. | 370/235 |
| 6,549,937 B1 | * | 4/2003 | Auerbach et al. ............. | 709/206 |
| 6,738,822 B2 | * | 5/2004 | Fukasawa et al. ............. | 709/231 |
| 6,976,092 B1 | * | 12/2005 | Daniell et al. ................. | 709/246 |
| 7,120,455 B1 | * | 10/2006 | Chen et al. ..................... | 455/466 |
| 2002/0075304 A1 | | 6/2002 | Thompson et al. | |
| 2003/0054810 A1 | * | 3/2003 | Chen et al. ..................... | 455/422 |
| 2004/0148346 A1 | * | 7/2004 | Weaver et al. ................ | 709/204 |
| 2004/0243941 A1 | | 12/2004 | Fish | |
| 2004/0268265 A1 | * | 12/2004 | Berger .......................... | 715/752 |
| 2006/0005133 A1 | * | 1/2006 | Lyle et al. ..................... | 715/708 |
| 2006/0031370 A1 | * | 2/2006 | Lyle et al. ..................... | 709/207 |

FOREIGN PATENT DOCUMENTS

| | | |
|---|---|---|
| CN | 1595951 A | 3/2005 |
| WO | 0237812 A2 | 5/2002 |
| WO | 02063486 A1 | 8/2002 |

OTHER PUBLICATIONS

Office Action issued by the State Intellectual Property Office dated Sep. 25, 2009.

* cited by examiner

*Primary Examiner* — Phenuel Salomon
(74) *Attorney, Agent, or Firm* — Garlick & Markison

(57) ABSTRACT

A presence system is provided with a communications device associated with a presentity that is capable of displaying a respective presentity presence state indicating a respective availability of the presentity as provided by a presence system to each contact on a contact list of the presentity. The communications device includes a presence user client communicatively coupled to the presence system to receive presence information associated with the presentity, in which the presence information includes the respective presentity presence states for the contacts on the contact list, and a display for displaying the contact list and a respective representation of the respective presentity presence state for each contact on the contact list.

20 Claims, 16 Drawing Sheets

SYSTEM AND METHOD FOR REPRESENTATION OF PRESENTITY PRESENCE STATES FOR CONTACTS IN A CONTACT LIST

CROSS-REFERENCE TO RELATED APPLICATIONS

This U.S. Nonprovisional Application for Patent claims the benefit of the filing date of U.S. Provisional Application entitled, SYSTEM AND METHOD FOR REPRESENTATION OF RICH PRESENCE FOR EACH CONTACT IN THE CONTACT LIST, having Ser. No. 60/738,296, filed on Nov. 18, 2005, which is incorporated herein by reference for all purposes. This U.S. Nonprovisional Application for Patent is a continuation-in-part of U.S. Nonprovisional Application for Patent entitled, SYSTEM AND METHOD FOR REPRESENTATION OF USER PREFERENCES AND POLICY IN CONTACT LIST, having Ser. No. 11/282,144, filed on Nov. 18, 15, 2005, now U.S. Pat. No. 7,941,752 issued May 10, 2011, which is incorporated herein by reference for all purposes.

BACKGROUND OF THE INVENTION

1. Technical Field of the Invention

The present invention relates in general to a presence-based communication system, and in particular, to managing a contact list in a presence-based communication system.

2. Description of Related Art

With today's widespread use of the Internet as a primary communication medium, data communication devices have been designed that are capable of communicating over packet-switched networks. For instance, telephones, pagers, personal digital assistant devices, cell phones, handheld computers, and fax machines can be accessed and controlled via the Internet. Communication over a packet-switched network using communication devices that traditionally communicate over a circuit-switched telecommunications network is generally known as network telephony, or IP telephony when an IP network is involved.

Various types of user communication devices (e.g., a cell phone, laptop or handheld PC, desktop PC, and the like) can identify themselves to the network using a suitable identifier (e.g., username@company.com). "Presence" refers to, for example, the availability, proximity, activity level, or operating state of a presentity, such as a user, object, or anything that can have some kind of state. Presence can be loosely defined as knowledge about a presentity that is displayed to a watcher. Status information about the presentity's communication and other conditions is collected by various methods and devices for aggregation and processing or by a presence engine in order to transform the raw data into some useful form for the watcher.

The ability for users or objects to monitor each other's presence is a feature offered in connection with many applications that support network telephony. For example, instant messaging ("IM") applications have a buddy list or contact list feature, in which a user of the application can determine whether select users or objects are available for engaging in communication. The data retrieved and returned to the contact list, e.g., "John OFFLINE" or "Susan ONLINE", is referred to as "presence information," and is generally maintained by a presence server in the data network, which is often a dedicated server. Typically, the presence server supports network telephony protocols such as Session Initiation Protocol (SIP). Users or objects can register their communication devices with the presence server in order to have their presence maintained and to allow various programs on the network to facilitate network telephony services. A first device user wishing to detect the presence of a second device user does so by "subscribing" with the presence server, such as via a SIP SUBSCRIBE message. The presence server intermediates between the first device user (also known as a "watcher" or "subscriber") and the second device user (or "presentity") to facilitate the communication of the presentity's presence information to the watcher.

Additional details about presence and presence modeling are set forth in the Internet Engineering Task Force (IETF) Request for Comment (RFC) 2778 entitled "A model for Presence and Instant Messaging," dated February 2002; RFC 2779 entitled "Instant Messaging/Presence Protocol Requirements," dated February 2002; and Internet-Draft identified as <<draft-schulzrinne-simple-rpids-01.ps>> and entitled "RPIDS—Rich Presence Information Data Format for Presence Based on the Session Initiation Protocol (SIP)," dated Feb. 18, 2003, which are incorporated herein by reference.

Presence information is conventionally displayed as a one-dimensional contact list that indicates the presence status (e.g., ONLINE or OFFLINE) of the user and one or more "buddies" or contacts. When the user selects a preference for a contact, the selected preference is currently not displayed on the list. For example, the user may prefer that a particular contact be able to reach him while he is at home. This can be accomplished by enabling a "find-me/follow-me" ("FMFM") feature for a contact in the preferences for that contact. However, if this preference setting is not conspicuously and constantly displayed in connection with the contact list, the user may not realize that the preference has not been set appropriately and the contact will not be able automatically to reach the user.

As another example, the user (presentity) may prefer that different contacts (watchers) see different presence states of the user. This can also be accomplished by setting different rules (filters) for each contact in the preferences of each contact. For example, the user can set the preferences so that a particular contact is able to see either the full presence state of the user, a partial presence state of the user or no presence state of the user. However, when the user selects different rules for one or more contacts to block some portion of the user's presence state for those contacts, the user is not able to discern the resulting presence state that each watcher sees by looking at the contact list. For example, if the user does not want to receive any communication requests from a certain contact (watcher), the watcher will only see that the user's presence state is unavailable.

Currently, a main menu option (such as "Tools") is used to set preferences and policies in connection with the user's contact list. By nature, setting up preferences/policies using the main menu requires the user to make a series of selections via an input device, so it is not a particularly good solution for instant communications when the user needs to control communications requests instantaneously. Additionally, after the selections are made, a similar series of selections will need to be made to determine the current preference/policy settings for a given contact or group of contacts in the contact list. Therefore, what is needed is a mechanism for representing the presence state of the user (presentity) for each contact (watcher) in the contact list.

SUMMARY OF THE INVENTION

Embodiments of the present invention provide a communications device associated with a presentity that is capable of displaying a respective presentity presence state indicating a respective availability of the presentity as provided to each contact on a contact list of the presentity. The communications device includes a presence user client communicatively coupled to a presence system via a communication network to receive presence information associated with the presentity, in which the presence information includes the respective presentity presence states for the contacts on the contact list, and a display for displaying the contact list and a representation of the respective presentity presence state for each contact on the contact list.

In one embodiment, the communications device further includes a graphical user interface coupled to the presence user client and the display for enabling a user of the device to change the presentity presence state provided to one or more contacts on the contact list from the contact list. For example, in an exemplary embodiment, the graphical user interface displays a respective contact presentity presence icon for each contact on the contact list, in which each contact presentity presence icon visually indicates the presentity presence state provided to the respective contact on the contact list. In addition, the graphical user interface also displays a respective menu associated with each contact presentity presence icon, in which each menu includes a list of available presentity presence states that can be provided to the respective contact associated with the respective contact presentity presence icon. The graphical user interface enables the user to select one of the available presentity presence states from the menu for each contact in the contact list.

In a further embodiment, the graphical user interface updates an appearance of the representation of the presentity presence state as displayed for each contact on the contact list whose associated presentity presence state is changed by the user. In still a further embodiment, the presence user client is in communication with the presence system to update the presentity presence state provided by the presence system to each contact on the contact list whose associated presentity presence state is changed by the user. For example, in an exemplary embodiment, the presence user client can update the presentity presence state provided by the presence system to one of the contacts by modifying preference information associated with that contact that is maintained by the presence system.

Embodiments of the present invention further provide a presence system including a presence server coupled to a communication network to receive and maintain presence information associated with a presentity, in which the presence information defining an actual presence state of the presentity indicating an actual availability of the presentity. The presence server further maintains preference information associated with the presentity, in which the preference information identifies a respective presentity presence state that indicates a respective availability of the presentity provided by the presence server to each contact on a contact list of the presentity. The presence system further includes a communications device associated with the presentity for displaying the contact list and a representation of the respective presentity presence state for each contact on the contact list.

Furthermore, embodiments of the present invention provide a method for representing a presence state of a presentity as provided to each contact on a contact list thereof. The method includes the steps of providing a contact list including one or more contacts who are watchers of a presentity associated with a presence system and displaying a representation of a respective presentity presence state for each contact on the contact list, in which each presentity presence state is maintained by the presence system and indicates an availability of the presentity as provided by the presence system to the respective contact on the contact list. The method further includes the steps of enabling the presentity to change the respective presentity presence state provided to each contact on the contact list from the contact list and updating an appearance of the representation of the presentity presence state for each contact on the contact list whose associated presentity presence state is changed by the presentity.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

Figure 1A:
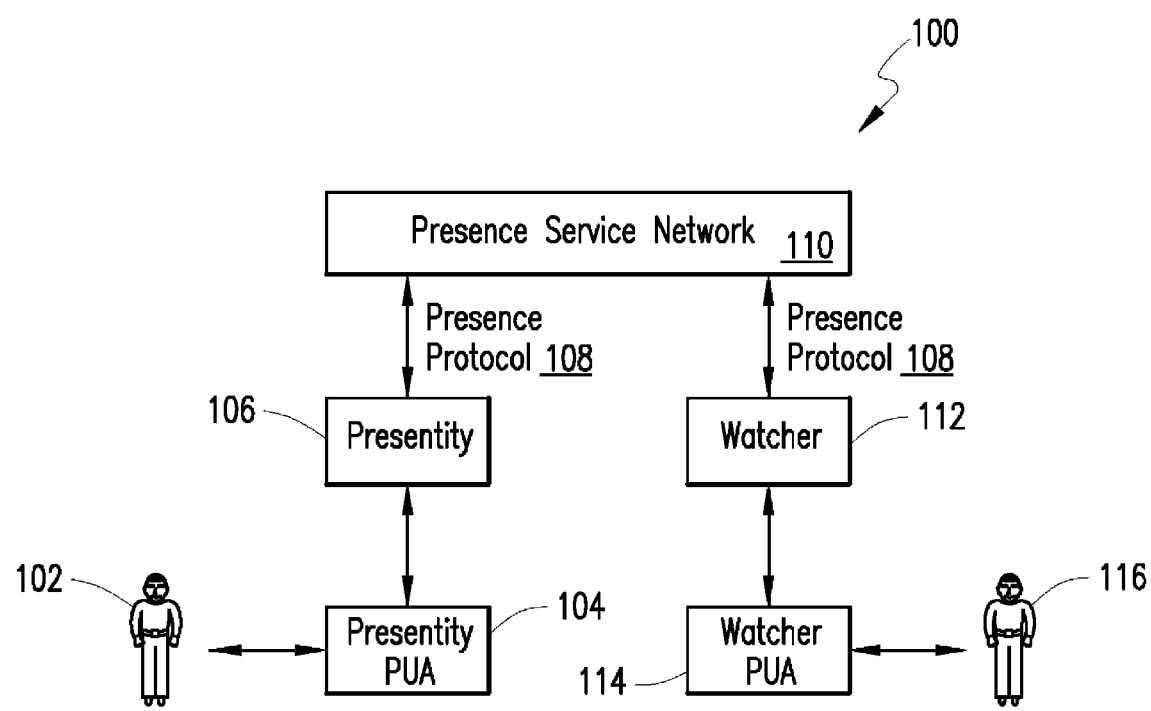
FIG. 1A depicts a high-level presence system for use with embodiments of the present invention.

Referring now to the drawings, and more particularly to FIG. 1A, depicted therein is a high-level presence system 100 where a Sender Principal 102 interfaces with a presence user agent (UA) 104 for transmitting presence information regarding a presentity 106. An application-specific presence protocol 108 is used for providing presence information to a presence service network (PSN) 110 that may be connected by an IP-based communications network. At the other end of transmission, a watcher 112 obtains the presence information using the presence protocol 108, which is provided to a Receiver Principal 116 who interfaces with a watcher presence user agent (PUA) 114 for controlling the watcher 112.

Figure 1B:
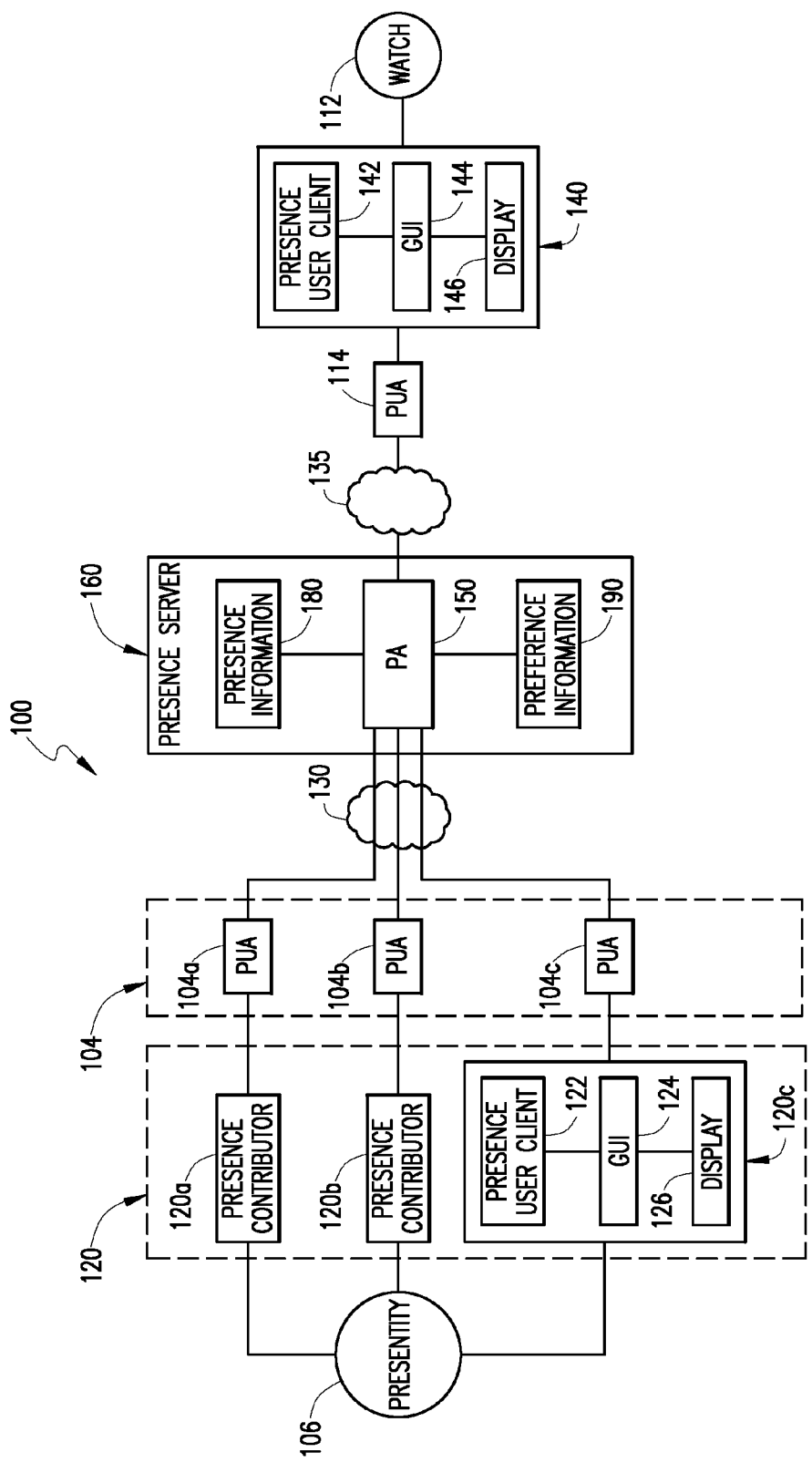
FIG. 1B illustrates a more detailed view of a presence system for use with embodiments of the present invention.

Turning now to FIG. 1B, there is illustrated a more detailed view of the presence system 100 for use with embodiments of the present invention. The presence system 100 includes one or more presentities (one of which is shown for convenience) 106, one or more presence user agents (PUAs) 104, a presence agent 150, a presence server 160 and one or more watchers 112 (one of which is shown for convenience) of the presentity 106. Examples of presentities 106 and watchers 112 include, but are not limited to, a person (e.g., user, administrator, manager or personnel), a group of people, a service (e.g., software application or data), a device or equipment (e.g., computer, fax machine or copy machine) and a facility (e.g., a room, an office or a building).

The presentity 106 provides presence information indicating the presentity's presence state to the presence system 100 via the presence user agents (PUAs) 104 associated with the presentity 106. Each PUA 104 represents an application that independently generates a component of the overall presence information for a presentity 106. In an exemplary embodiment, each of the PUAs 104a-c interfaces with a respective presence contributor 120a-c to provide a portion of the presence information 180 of the presentity 106 to the presence system 100. Examples of presence contributors 120a-c include, but are not limited to, devices, services, software applications, facilities and users (e.g., user presentity, administrator, personnel and other users). Each PUA 104a-c receives presence information either directly from the associated presence contributor 120a-c or through a system with knowledge of the presence state associated with the presence contributor 120a-c.

For example, as shown in FIG. 1B, one of the presence contributors 120c is a user-operated physical communications device capable of sending and/or receiving communications over a communications network 130. Examples of such communications devices 120c include, but are not limited to, a desktop phone, a laptop computer, a personal computer, a cell phone, a PDA and other user-operated communications device. In one embodiment, the PUA 104c is included within the communications device 120c itself to enable the presentity 106 or another user to generate presence information on the communications device 120c and/or display the presentity presence information on the communications device 120c. In another embodiment, the PUA 104c is located within a network device or the communications network 130 to receive presence information from the communications device 120c. In either embodiment, communications device 120c may include a presence user client 122 for interfacing with the presence user agent 104c and a graphical user interface 124 for displaying the real-time presence information on a display 126 of the communications device 120c in the form of icons and/or text strings. In addition, the graphical user interface 124 may also include buttons that enable the presentity 106 or other user to invoke an action, such as changing a presence state of the presentity 106 as provided to one or more watchers 112, via the respective PUA 104c.

However, in general, the PUAs 104 represent applications (e.g., software programs) running on one or more physical communication devices, such as a user-operated communications device 120c, a computer network server, a telephony server (e.g., a circuit switch, IP router, gateway, etc.), a web server or any other networked device (e.g., printer, fax machine, etc.). Thus, in general, each PUA 104 includes any hardware, software, firmware, or combination thereof for providing presence information to the presence system 100. As an example, each PUA 104 could include one or more processors that execute instructions and one or more memories that store instructions and data used by the processors. The processor is generally understood to be a device that drives a general-purpose computer. It is noted, however, that other processor devices such as microcontrollers, Field Programmable Gate Arrays (FPGAs), or Application Specific Integrated Circuits (ASICs), or a combination thereof, can be used as well and achieve the benefits and advantages described herein.

Typically, a PUA 104 generates presence information when a change in presence state occurs. Examples of changes in presence state include, but are not limited to, turning on and off a communications device 120c, modifying the registration from a communications device 120c, changing the instant messaging status on a communications device 120c, operating a communications device (e.g., sending a fax, receiving a fax, queuing a print job to a printer, etc.) and requesting or initiating a service (e.g., initiating Internet access, activating voice mail, etc.). As an example, when a presentity initiates or answers a phone call on a communications device 120c, the PUA 104c associated with the communications device 120c updates the presentity's presence state to "On the Phone."

The presence information from each of the PUAs 104 is collected by one or more presence agents (PAs) 150. In FIG. 1B, only one PA 150 is shown for simplicity. However, it should be understood that in other embodiments, there can be multiple PAs 150 for a presentity 106, each of which is responsible for a subset of the total subscriptions (requests for presence information from watchers 112) currently active for the presentity 106.

The PA 150 aggregates the presence information from each of the sources (e.g., PUA's 104) and maintains the current complete presence information for the presentity 106. The presence information 180 indicates, for example, the availability of the presentity, the current activity of the presentity, the local time where the presentity is located, the current location of the presentity, the current status of the active terminals and/or applications running on active terminals and the current status of any services/applications associated with the presentity.

The PA 150 is further operable to provide none, some or all of the presence information 180 to one or more watchers 112 who have subscribed to the presence service of the presentity 106 via a communication network 135 and the PUA 114 of the watcher after filtering the presence information 180 according to the preference information 190. Typically, the PA 150 interfaces via the PUA 114 with a presence user client 142 on a watcher communications device 140 (e.g., desktop phone, cell phone, PDA, desktop computer, laptop computer, etc.) via the communication network 135 to provide the current presence state of the presentity 106 to the watcher 112. For example, the watcher communications device 140 can include a graphical user interface 144 for displaying the real-time presence information on a display 146 of the device 140 in the form of icons and/or text strings. In addition, the graphical user interface 144 may also include buttons that enable the watcher 112 to invoke an action, such as initiating an instant message (IM), text message or voice communication session with the presentity 106 or updating the presence information 180 of the presentity 106 or watcher 112.

In FIG. 1B, the communications networks 130 and 135 represent any type of network over which media (e.g., circuit-switched or packet-switched data) may be sent. For example, the communications networks 130 and 135 can include the Public Land Mobile Data Network (PLMDN), one or more private local area networks (LANs), the Internet and/or any other type or combination of networks.

The presence server 160 is a physical entity that can operate as either the PA 150 or as a proxy server for routing requests from watchers 112 to the PA 150. The presence server 160 stores the presence information 180 for a plurality of presentities 106. Thus, the PA 150, in combination with the presence server 160, is operable to receive presence information of the presentity 106 from the PUAs 104, receive requests from watchers 112 for the presence information and provide the presence information to the watcher(s) 112. When acting as a PA 150, the presence server 160 can also be co-located with a PUA 104.

The presence server 160 further stores preference information 190 for the presentities 106 and watchers 112 of the presence system 100. For example, the preference information 190 can include both presentity preference information (e.g., privacy filters) set by the presentity 106 for each watcher 112 and watcher preference information (e.g., watcher filters) set by each watcher 112 for presentities 106. The preference information 190 operates to filter the presence information 180 of a presentity 106 provided to a watcher 112 to accommodate privacy concerns, prioritization requirements, viewing requirements, administrator policies and security considerations. For example, in one embodiment, the preference information 190 sets the presence state of the presentity 106 provided to one or more watchers 112 of the presentity 106.

The presence system 100 uses a presence protocol to provide the presence services to presentities 106 and watchers 112. An example of a presence protocol that can be used in the presence system 100 is the Session Initiation Protocol (SIP), as described in J. Rosenberg, et al., "SIP: Session Initiation Protocol" RFC: 3261, June 2002 and in A. Roach, et al., "Session Initiation Protocol (SIP)—Specific Event Notification," RFC: 3265, June 2002, each of which are hereby incorporated by reference. SIP is an application-layer control protocol used to create, modify and terminate communication (voice, text and/or multimedia) sessions. SIP can be used with other protocols, such as the Real-time Transport Protocol (RTP), the Real-Time Streaming Protocol (RTSP), the Session Description Protocol (SDP), the International Telecommunication Union-Telecommunications ("ITU-T") H.263 standard (video CODEC), the G.711 and G.729 standards (audio CODECs), and other or additional standards or protocols. As will be appreciated, other or additional protocols and configurations may be used.

SIP networks are capable of routing requests from any user on the network to the server that maintains the registration state for a user. Thus, SIP networks enable a watcher 112 to transmit a SUBSCRIBE request for presence information relating to a particular presentity 106 to the presence server 160 that maintains the presence information for the presentity 106. In operation, the presence server 160 and PA 150 may be co-located with the SIP proxy/registrar for efficiency purposes.

Figure 2:
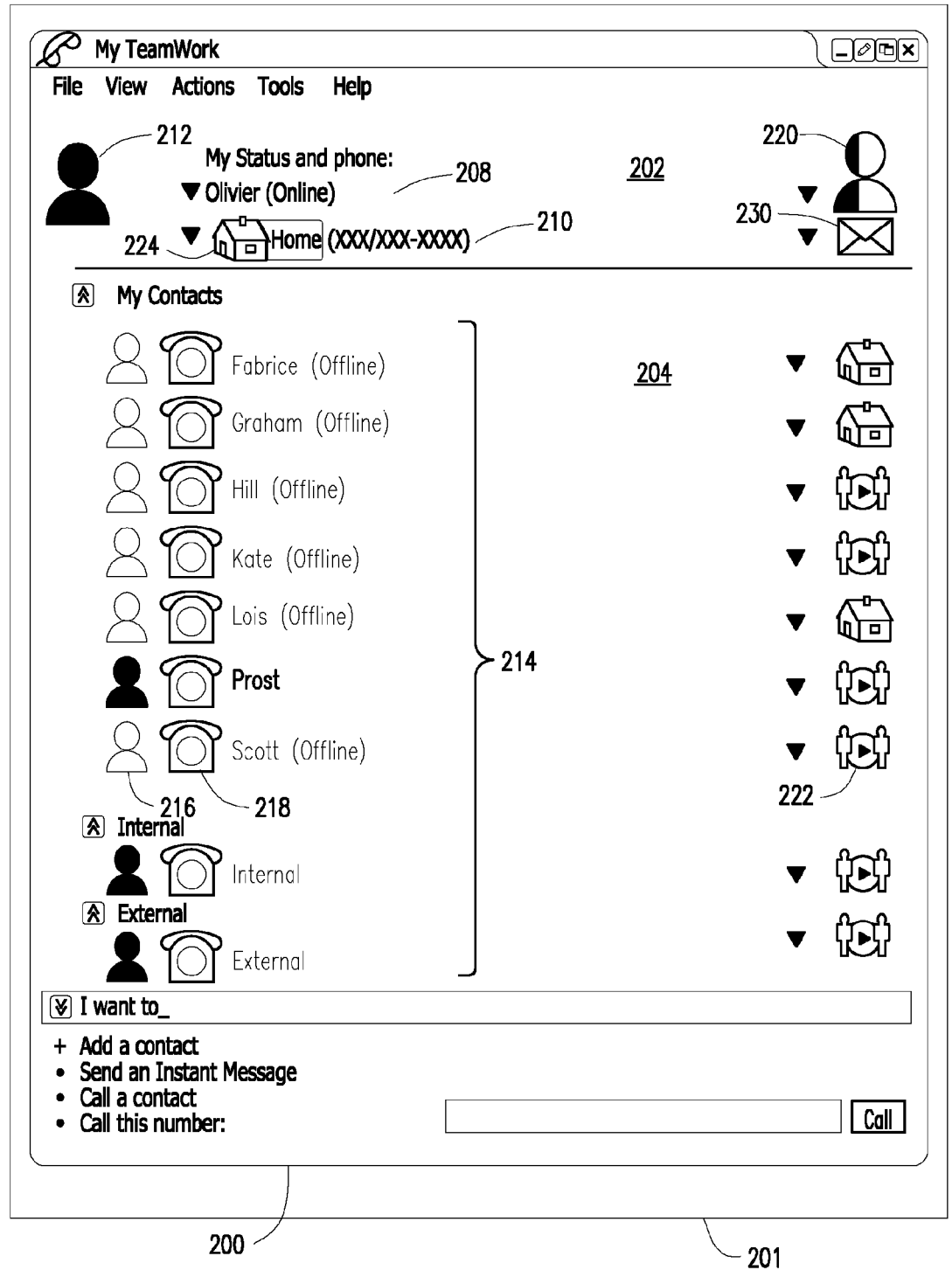
FIG. 2 illustrates a contact list page as displayed on a communications device of a user in accordance with one embodiment.

FIG. 2 illustrates a contact list page 200 as displayed on a communications device 201 (e.g., the communications device 120c shown in FIG. 1B) of a user (presentity) in accordance with one embodiment. In one embodiment, the communications device 201 comprises a handheld communications device, although it will be recognized that the embodiments described herein may be implemented using any number of different types of communications devices. In addition, in exemplary embodiments, the communications device 201 includes the display 126 of FIG. 1B for displaying the contact list page 200, the graphical user interface 124 of FIG. 1B for enabling the user to change information displayed on the contact list page 200 (e.g., change views and/or invoke an action to change presence and/or preference information with the presence system) and the presence user client 122 of FIG. 1B for receiving presence information from the presence system for display on the display 126 and communicating any changes made to the presence and/or preference information via the graphical user interface 124 to the presence system.

Referring again to FIG. 2, the contact list page 200 includes a user status section 202 and a contact status section 204. The user status section 202 includes a name 208 of the user, contact information 210 for the user, and a user presence icon 212, the appearance of which corresponds to the presence state of the user. For example, in the embodiment illustrated in FIG. 2, the user presence icon 212 is a first color if the presence state of the user is ONLINE (or AVAILABLE) and a second color if the presence state of the user is OFFLINE (or UNAVAILABLE).

The contact status section 204 includes a contact list 214 comprising the names of one or more contacts or contact groups (e.g., "Internal" and "External"), which may also be watchers of the user. The term "contact" will hereinafter be used to refer to an individual contact, as well as a contact group.

Each name in the list 214 has associated therewith a contact presence icon 216, the appearance of which corresponds to the presence state of the contact as presented to one or more watchers. For example, in the embodiment illustrated in FIG. 2, the contact presence icon 216 is a first color if the presence state of the contact with which it is associated is ONLINE (or AVAILABLE) and a second color if the presence state of the contact with which it is associated is OFFLINE (or UNAVAILABLE).

Each contact in the contact list 214 also has associated therewith a contact information type icon 218 that indicates the type of phone number that is provided for the associated contact. The contact information type icon 218 indicates whether the phone number provided for the contact is a home number, an office number, a mobile number, or some other type of number.

As illustrated in FIG. 2, in accordance with one embodiment, the user status section 202 includes an icon 220 indicating a preference level of the user with respect to certain features. For purposes of example, the FMFM feature described above will be used to explain this aspect of the embodiment and the importance of being able to display the users preference and policy; however, it will be recognized that preference and policy may be set and displayed in a similar manner for other available features and management of communications events as well. For example, another preference/policy setting related to the presentity presence state provided to contacts (watchers) on the contact list will be described below in connection with FIGS. 11-15.

Referring again to FIG. 2, contacts for which the FMFM feature is enabled will have their calls to the user automatically redirected to the contact number indicated in the contact information 210 for the user. As will be described in greater detail hereinbelow, the FMFM feature for each contact in the contact list 214 is enabled or not according to the preference level selected by the user, as visually persistently indicated by the icon 220, and a VIP level of the contact as set by the user. An icon 222 associated with each contact in the contact list 214 indicates the preference and policy category for the contact, which in the illustrated embodiment indicates whether the FMFM feature is enabled for the associated contact. The appearance of the icon 222 associated with a contact for which the FMFM feature has been enabled will be identical to an icon 224 associated with the contact information 210 indicated in the user presence section 202.

Figure 3:
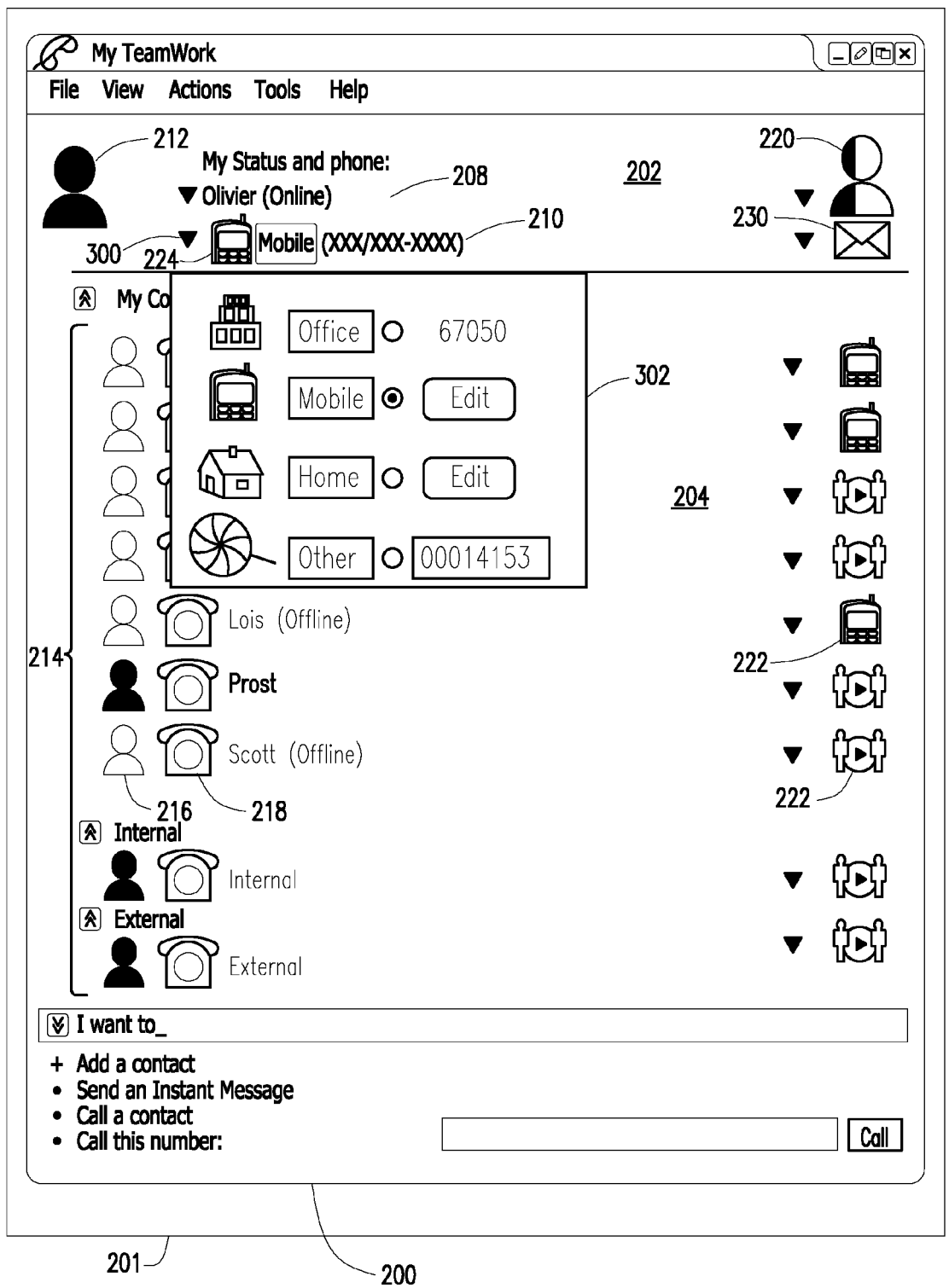
FIG. 3 illustrates a change in the number to which contacts of the user for which a FMFM feature has been enabled will be directed in accordance with one embodiment.

As illustrated in FIG. 3, the user can change the number to which calls from contacts for whom the FMFM feature is enabled will be automatically redirected by clicking on an arrow 300, which results in the display of a menu 302. Using the menu 302, the user can select any one of a number of different contact options. For example, the illustrated options include "Office", "Mobile", "Home", and "Other". As illustrated in FIG. 3, selection of a different contact option results in a change of appearance of the icon 224. As a result, the appearance of each of the icons 222 associated with contacts for which the FMFM feature is enabled is automatically updated accordingly.

Figure 4:
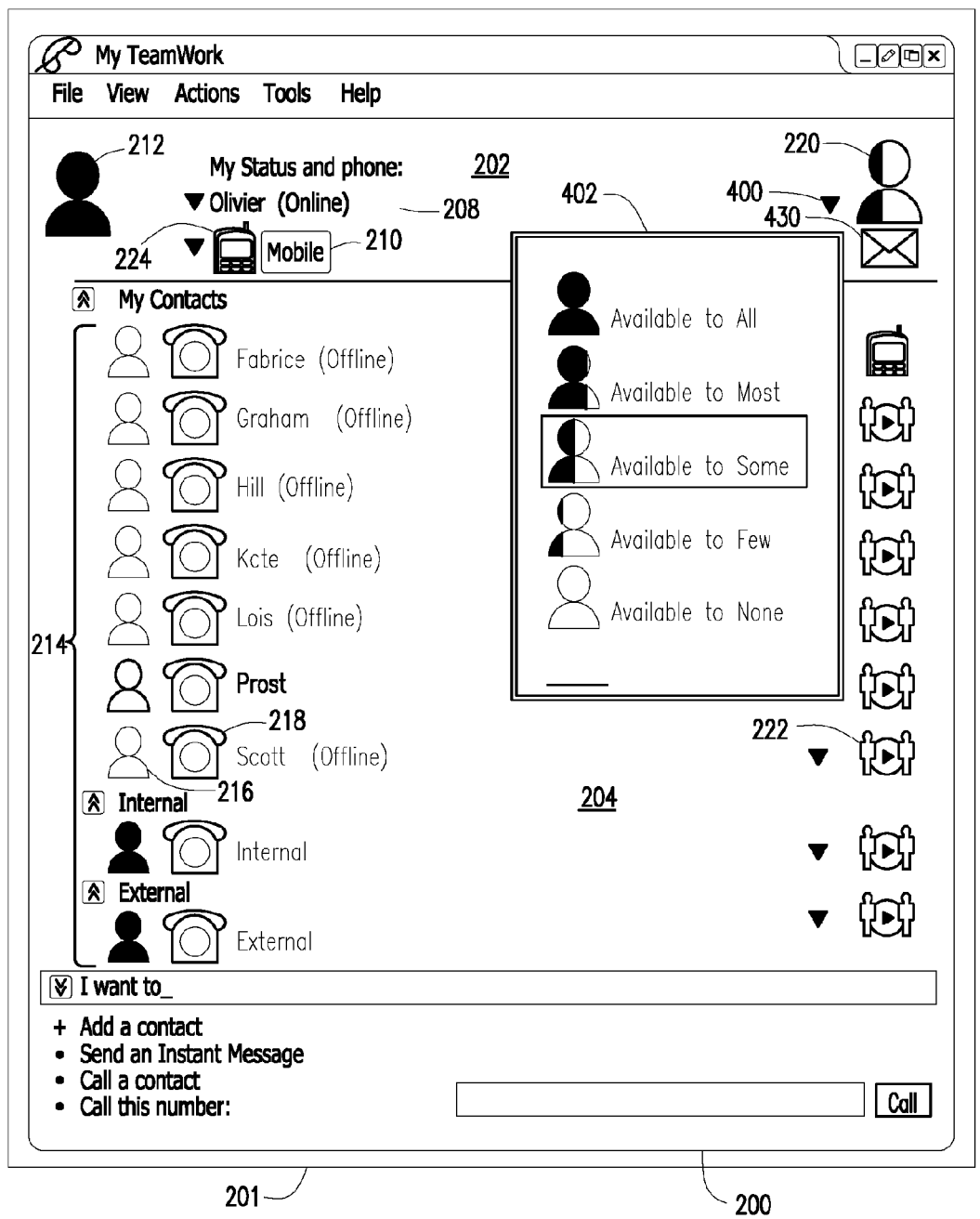
FIG. 4 illustrates a change in preference level of the user in accordance with one embodiment.

FIG. 4 illustrates changing of the preference level of the user. To change his or her preference level, the user clicks on an arrow 400 associated with the icon 220, resulting in display of a menu 402 comprising a list of available preference levels. In one embodiment, the preference levels include "Available to All", "Available to Most", "Available to Some", "Available to Few", and "Available to None." Once the user selects a preference level, the appearance of the icon 220 is updated to visually indicate the currently selected preference level. Respectively, this change will impact whether the contact is enabled or not enabled for FMFM shown via icon 222. In one embodiment, the icon 220 is a first color when "Available to All" is selected, a second color when "Available to None" is selected, and some of the first and second colors when one of the remaining levels is selected. In particular, when the selected level is "Available to Most", ¾ of the icon 220 will be the first color and ¼ of the icon will be the second color; when the selected level is "Available to Some", ½ of the icon 220 will be the first color and ½ of the icon will be the second color; when the selected level is "Available to Few", ¼ of the icon 220 will be the first color and ¾ of the icon will be the second color.

Figure 5:
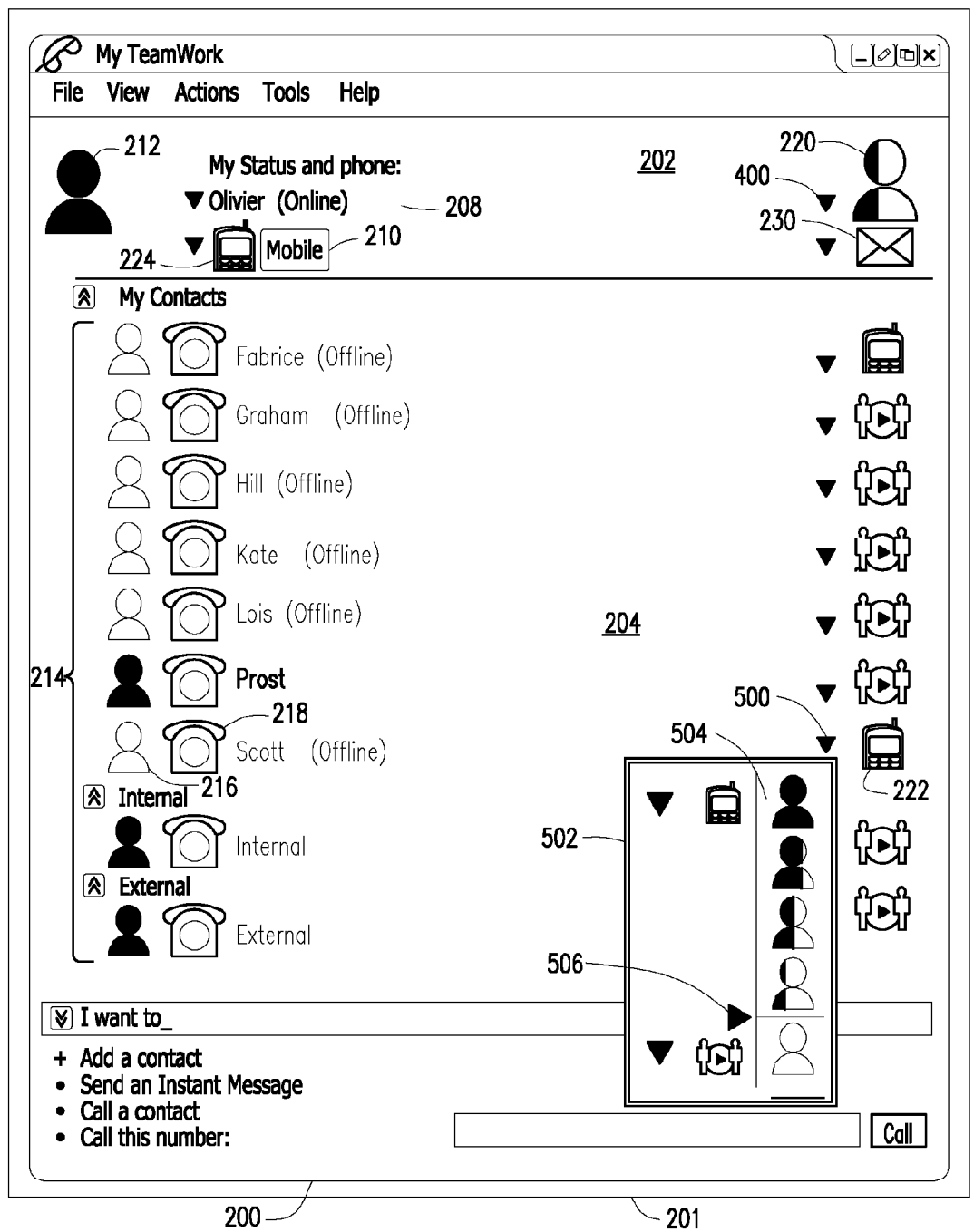
FIG. 5 illustrates a change in a VIP level of a contact of the user in accordance with one embodiment.

FIG. 5 illustrates changing of the VIP level of a contact. To change the VIP level of a contact, the user clicks on an arrow 500 associated with the contact, resulting in display of a menu 502 comprising a plurality of icons, the appearance of each of which corresponds to one of the available preference levels of the user as set forth above. Using the menu 502, the user moves a slide 506 to a position on the menu 502 to set the VIP level of the contact. In particular, so long as the preference level of the user, as indicated by the icon 220, is set to a level that is above the position of the slide 506 on the menu 502, the preference and policy category of the user will be such that the FMFM feature for the contact will be enabled. In contrast, if the preference level of the user, as indicated by the icon 220, is set to a level that is below the position of the slide 506 on the menu 502, the FMFM feature will not be enabled for the contact. In the example illustrated in FIG. 5, the VIP level of the contact "Scott" is set such that, so long as the user preference level is set to any level above "Available to None", the FMFM feature will be enabled for "Scott" and the appearance of the icon 222 displayed in connection with that "Scott" will be identical to the appearance of the icon 224.

Figure 6:
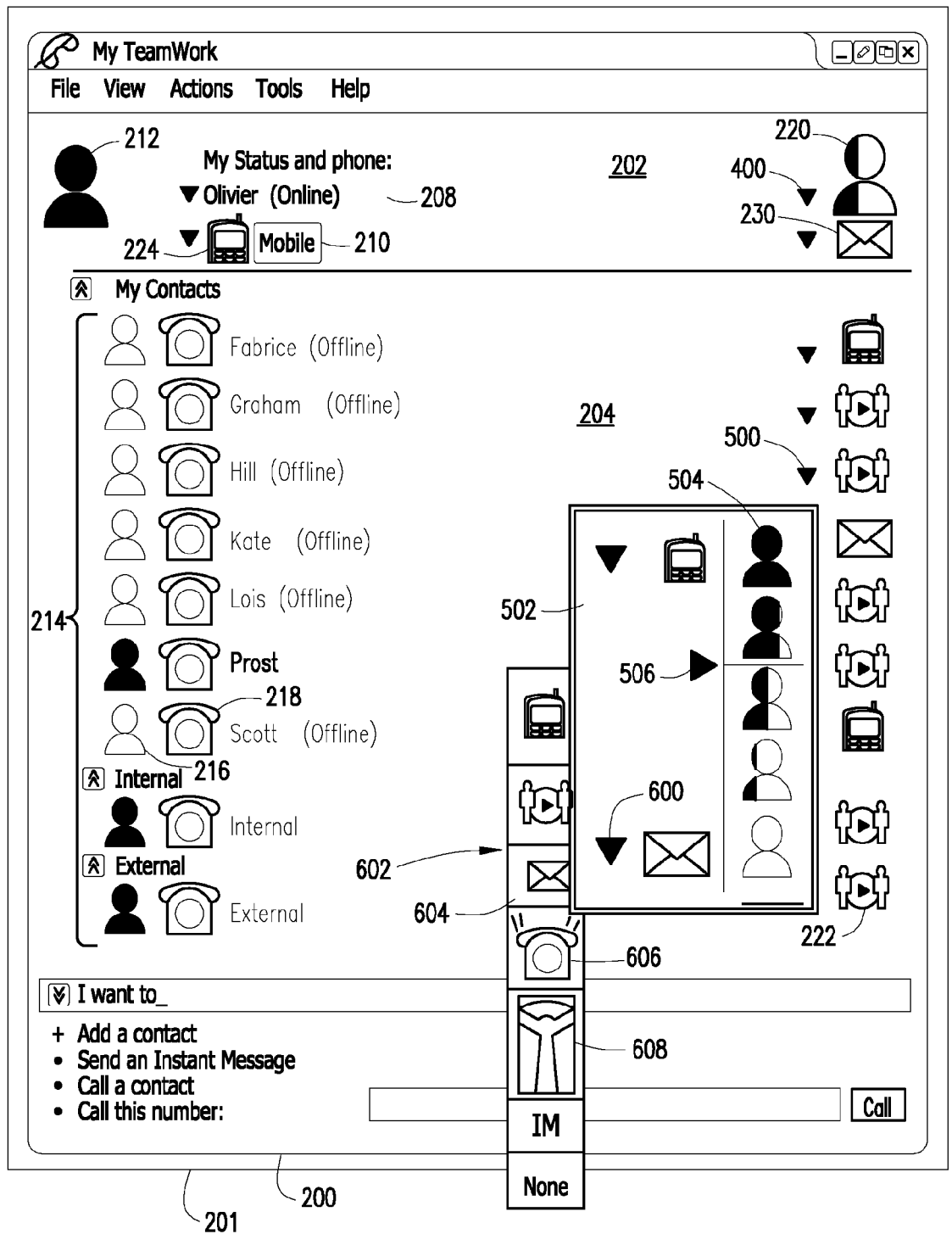
FIG. 6 illustrates a change in an option of a VIP level of a contact of the user in accordance with one embodiment.

Referring now to FIG. 6, clicking on an arrow 600 in the menu 502 results in the display of another menu 602 comprising a set of icons representing options for handling communications events initiated by contacts for which the FMFM feature is not enabled. For example, selection of an icon 604 would result in the contact being connected to a voice mailbox when the user is not available and the FMFM feature is not enabled. Selection of an icon 606 would result in the phone ringing non-stop when the user is not available and the FMFM feature is not enabled. Selection of an icon 608 would result in the contact being connected with an instant assistant feature when the user is not available and the FMFM feature is not enabled.

In the example illustrated in FIG. 6, the VIP option of the VIP level of a contact "Kate" is set such that, when the user is unavailable, calls from that contact will be directed to the user's voice mail box.

Figure 7:
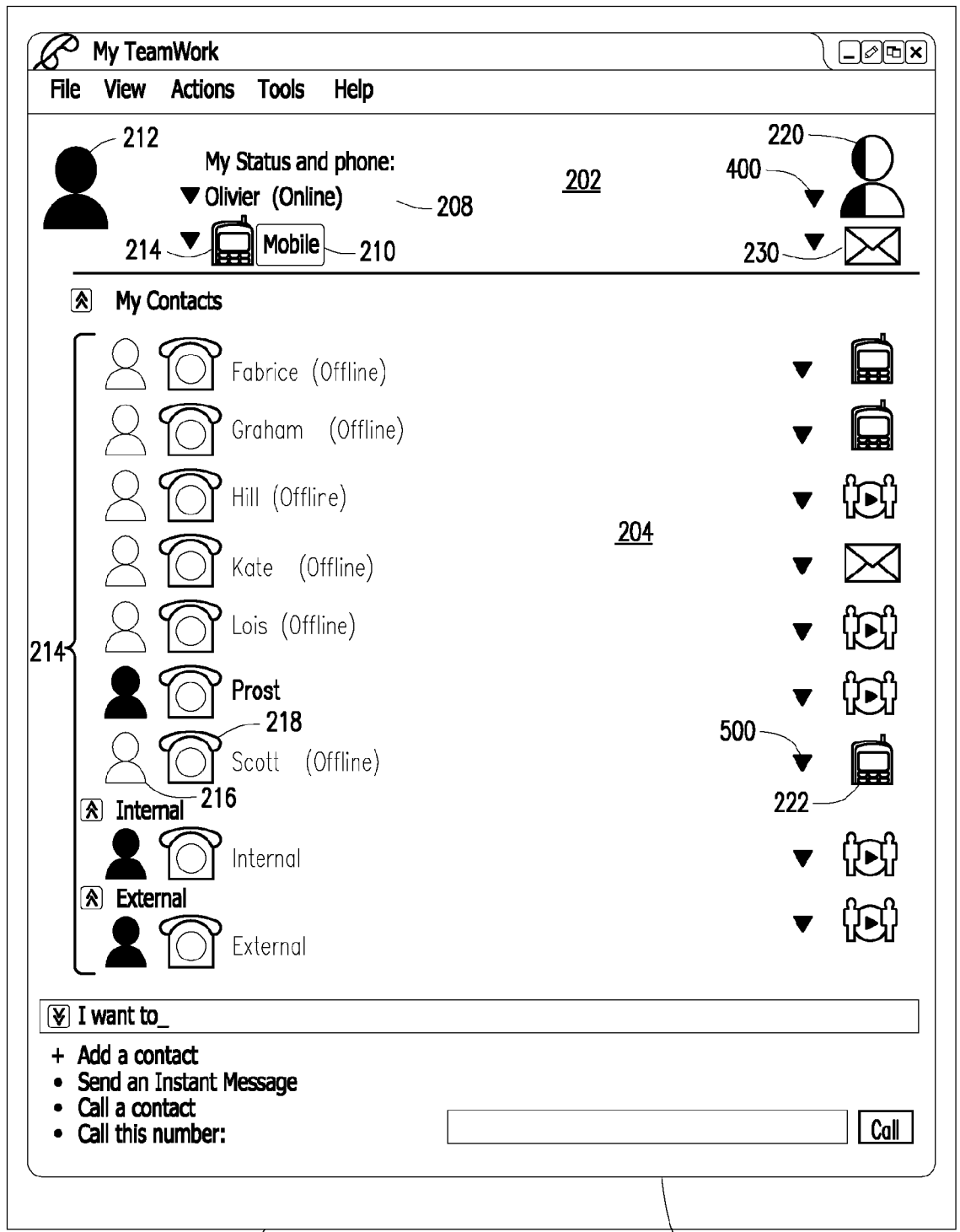
FIG. 7 illustrates the effect of the changes illustrated in FIGS. 5 and 6 on the contact list page of FIG. 2.

FIG. 7 illustrates the appearance of the contact list page 201 after the VIP level of "Scott" has been changed, as described above with reference to FIG. 5, and the VIP option of a VIP level of a contact "Kate" has been changed, as described above with reference to FIG. 6. As previously noted, the term "contact" as used herein includes contact groups. Two such contact groups may be "Internal", which will be defined herein to include all persons employed by the entity that employs the user, and "External", which will be defined herein to include all persons not included in the "Internal" contact group. In one embodiment, individual contact VIP level and options will take precedence over any group contact VIP level and options for the same caller. For example, if a caller who is part of the Internal contact group is also individually specified in the contact list, the preference and policy category selected for the individual, rather than that selected for the Internal contact group, will apply to a call from that caller.

Referring again to FIG. 7, an overflow options icon 230 indicates what will happen in "exceptional cases" if an unexpected communications event (e.g., telephony, IM, or some other event) occurs. For example, assume one of the contacts in the contact list 200 for which the FMFM feature is enabled calls the user at his office. Because the FMFM feature is enabled, the call is redirected to the user's mobile phone. Assume further that the user's mobile phone, when the call from the contact is redirected thereto, is busy. This is an "exceptional case" that is handled as indicated by the overflow options icon 230. In the illustrated example, the icon 230 indicates that the call will go into the user's office voice mailbox.

Figure 8:
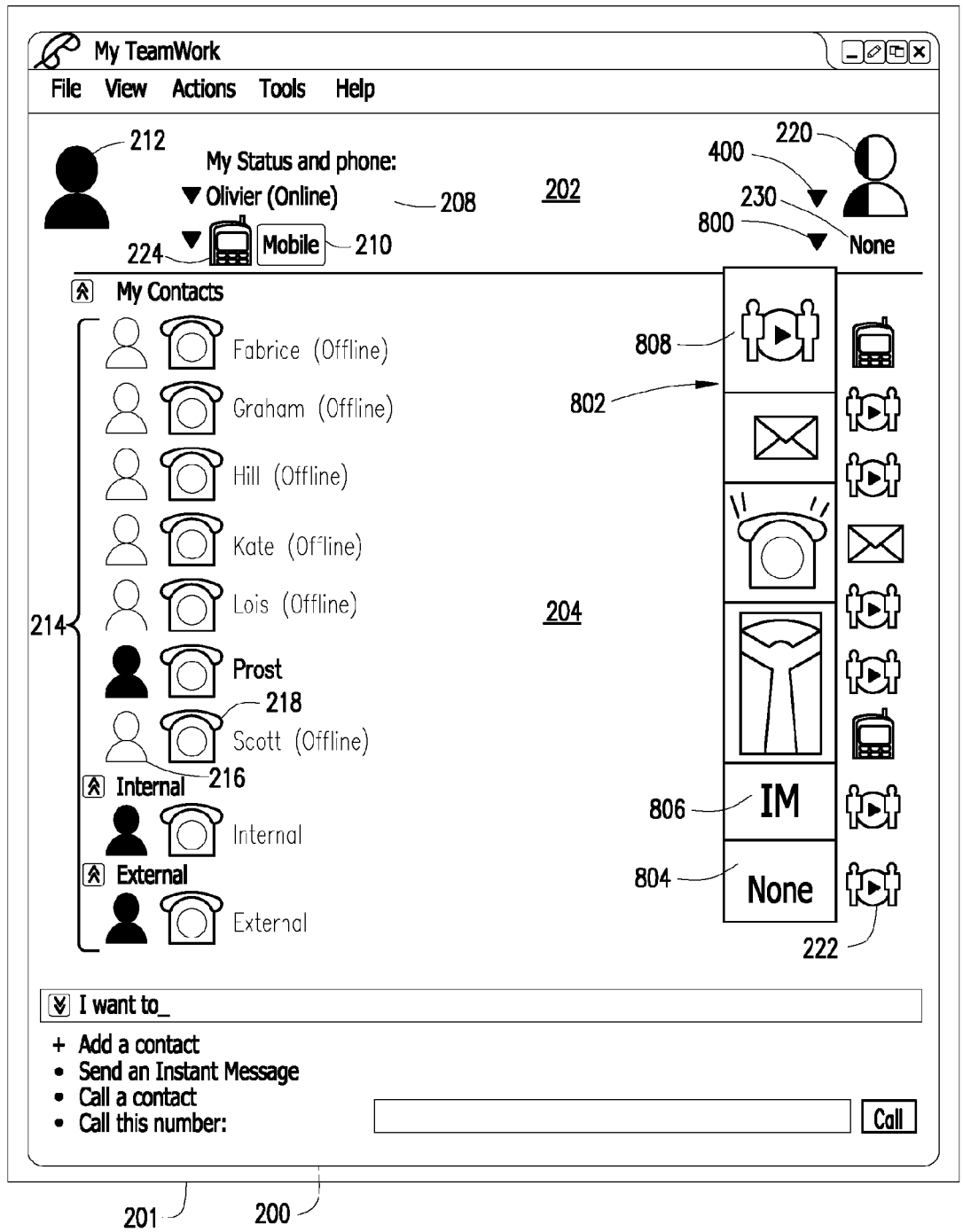
FIG. 8 illustrates a change in overflow options exercised in connection with exceptional cases in accordance with one embodiment.

FIG. 8 illustrates how an overflow option for handling exceptional cases may be selected. As illustrated in FIG. 8, clicking on an arrow 800 associated with the overflow options icon 210 results in display of a menu 802. The menu 802 is similar, if not identical, to the menu 602 and comprises a set of icons representing overflow options that can be selected for handling exceptional cases. For example, selection of an icon 804 would result in the phone not being rung and no action being taken in response to an exceptional case. Selection of an icon 806 would result in the caller being connected to an instant messaging application in response to an exceptional case. Selection of an icon 808 would result in the caller being connected with a designated third party (e.g., the user's assistant), in response to an exceptional case.

Figure 9B:
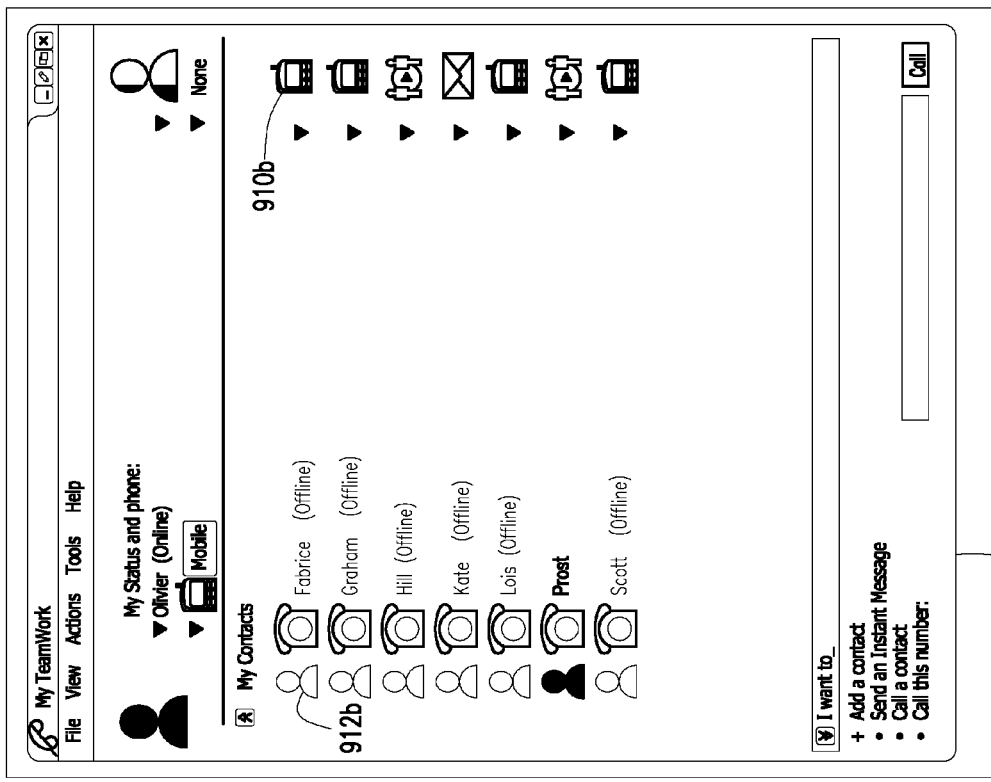
FIGS. 9A and 9B each illustrate a contact list page of one of two users each of whom is a contact of the other such that the preference level and contact VIP levels selected by each of the users affect the appearance of the contact list page of the other user in accordance with one embodiment.
Figure 9A:
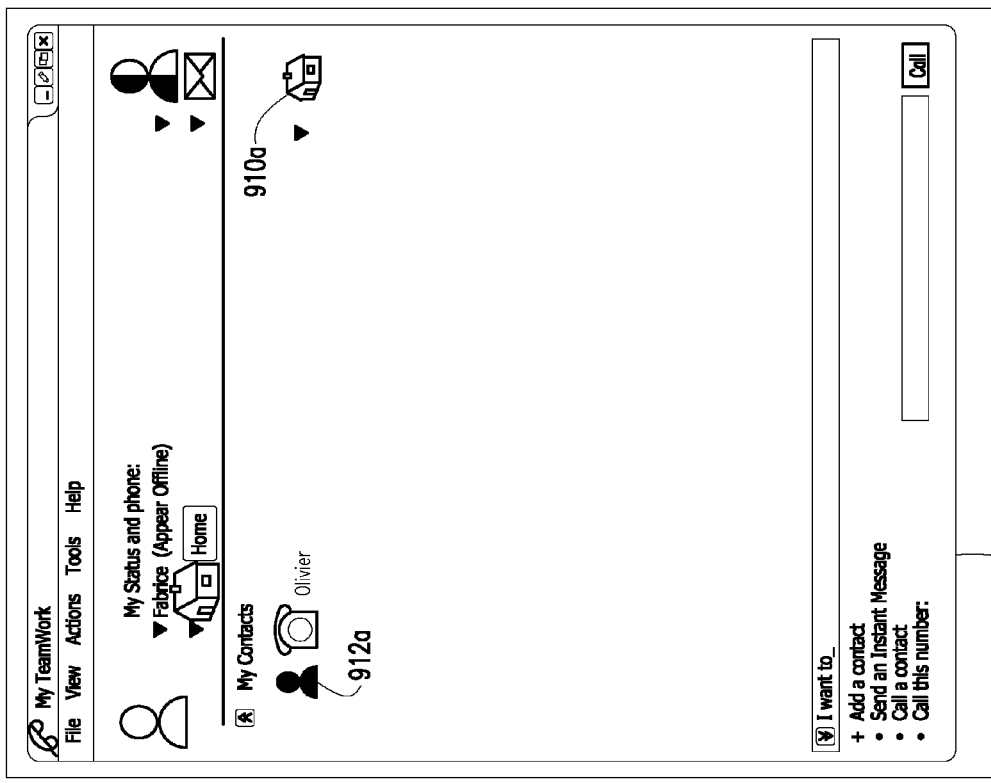

FIGS. 9A and 9B each illustrate a contact list page for one of two users, each of whom is a contact of the other. In particular, FIG. 9A illustrates a contact list page 900a for a first user "Fabrice" displayed on a first communications device (e.g., the communications device 140 shown in FIG. 1B). FIG. 9B illustrates a contact list page 900b for a second user "Olivier" displayed on a second communications device (e.g., the communications device 120c shown in FIG. 1B). For reasons described in detail above, it is apparent from the appearance of the contact list page 900a that the user Fabrice is OFFLINE and that a FMFM feature for a contact Olivier (i.e., the second user) is enabled. Similarly, it is apparent from the appearance of the contact list page 900b that the user Olivier is ONLINE and that the FMFM feature for a contact Fabrice (i.e., the first user) is enabled.

Referring to FIG. 9A, the fact that the FMFM feature for Olivier is enabled in Fabrice's contact list is reflected by the appearance of an icon 910a, which indicates to Fabrice that if Olivier calls, Olivier's phone call will be forwarded to Fabrice's home phone. Similarly, referring to FIG. 9B, the fact that the FMFM feature for Fabrice is enabled in Olivier's contact list is reflected by the appearance of an icon 910b, which indicates to Olivier that if Fabrice calls, Fabrice's phone call will be forwarded to Olivier's mobile phone. Additionally, as illustrated in FIG. 9A, a presence icon 912a for Olivier in the contact list of Fabrice indicates that Olivier is ONLINE. Similarly, as illustrated in FIG. 9B, a presence icon 912b for Fabrice in the contact list of Olivier indicates that Fabrice is OFFLINE.

Figure 10B:
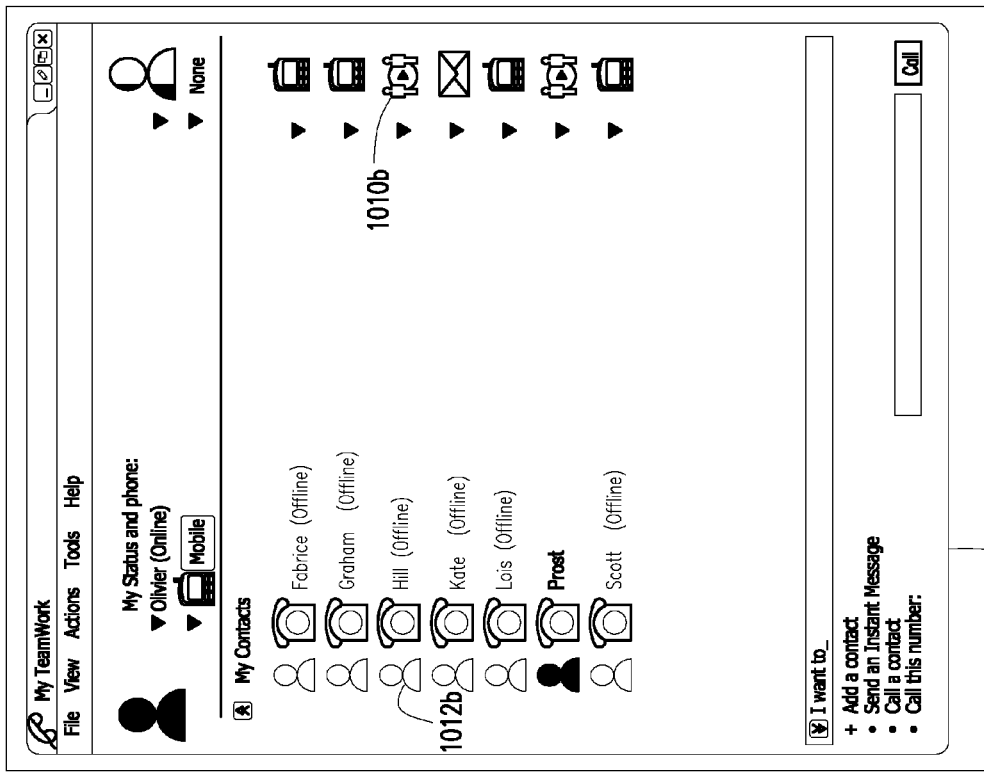
FIGS. 10A and 10B each illustrate a contact list page of one of two users each of whom is a contact of the other user such that the preference level and contact VIP levels selected by each of the users affect the appearance of the contact list page of the other user in accordance with one embodiment.
Figure 10A:
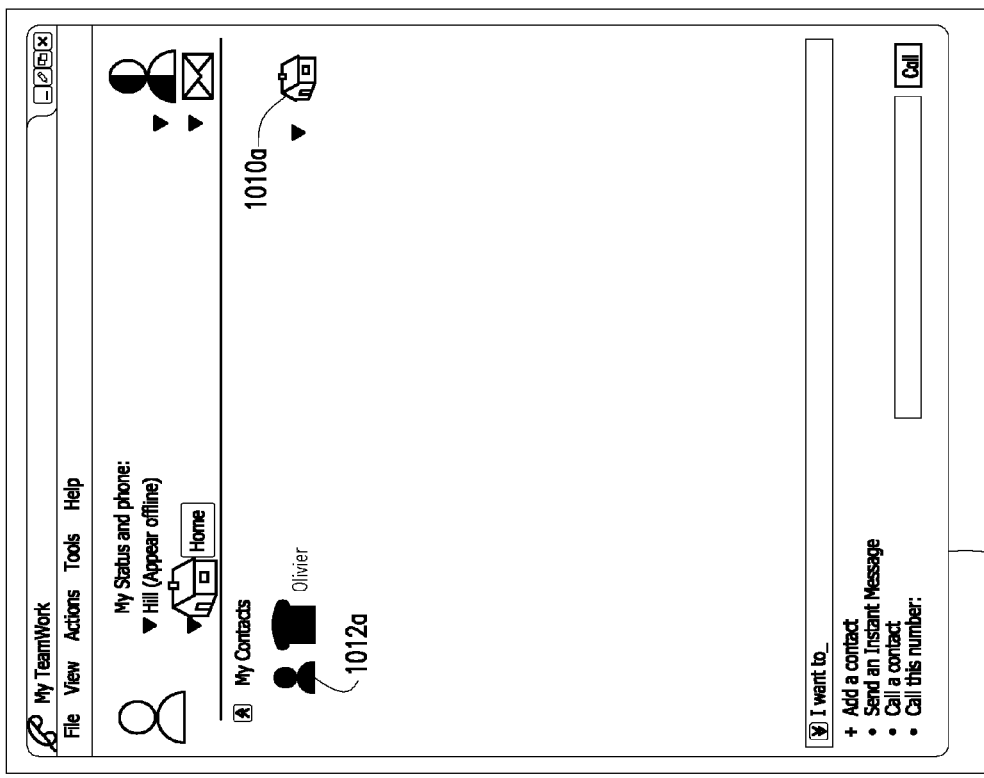

FIGS. 10A and 10B each illustrate a contact list page for one of two users, each of whom is a contact of the other. In particular, FIG. 10A illustrates a contact list page 1000a for a first user "Hill" displayed on a first communications device (e.g., the communications device 140 illustrated in FIG. 1B). FIG. 10B illustrates a contact list page 1000b for a second user "Olivier" displayed on a second communications device (e.g., the communications device 120c shown in FIG. 1B). For reasons described in detail above, it is apparent from the appearance of the contact list page 1000a that the user Hill is OFFLINE and that a FMFM feature for a contact Olivier (i.e., the second user) is enabled. Similarly, it is apparent from the appearance of the contact list page 1000b that the user Olivier is ONLINE and that the FMFM feature for a contact Hill (i.e., the first user) is not enabled.

Referring to FIG. 10A, the fact that the FMFM feature for Olivier is enabled in Hill's contact list is reflected by the appearance of an icon 1010a, which indicates to Hill that if Olivier calls, Olivier's phone call will be forwarded to Hill's house phone. Similarly, referring to FIG. 10B, the fact that the FMFM feature for Hill is not enabled in Olivier's contact list is reflected by the appearance of an icon 1010b, which indicates to Olivier that if Hill calls, Hill's phone call will not be forwarded to Olivier's mobile phone, but instead, Hill's phone call will be forwarded to Olivier's assistant. Additionally, as illustrated in FIG. 10A, a presence icon 1012a for Olivier in the contact list of Hill indicates that Olivier is ONLINE. Similarly, as illustrated in FIG. 10B, a presence icon 1012b for Hill in the contact list of Olivier indicates that Hill is OFFLINE.

Figure 11:
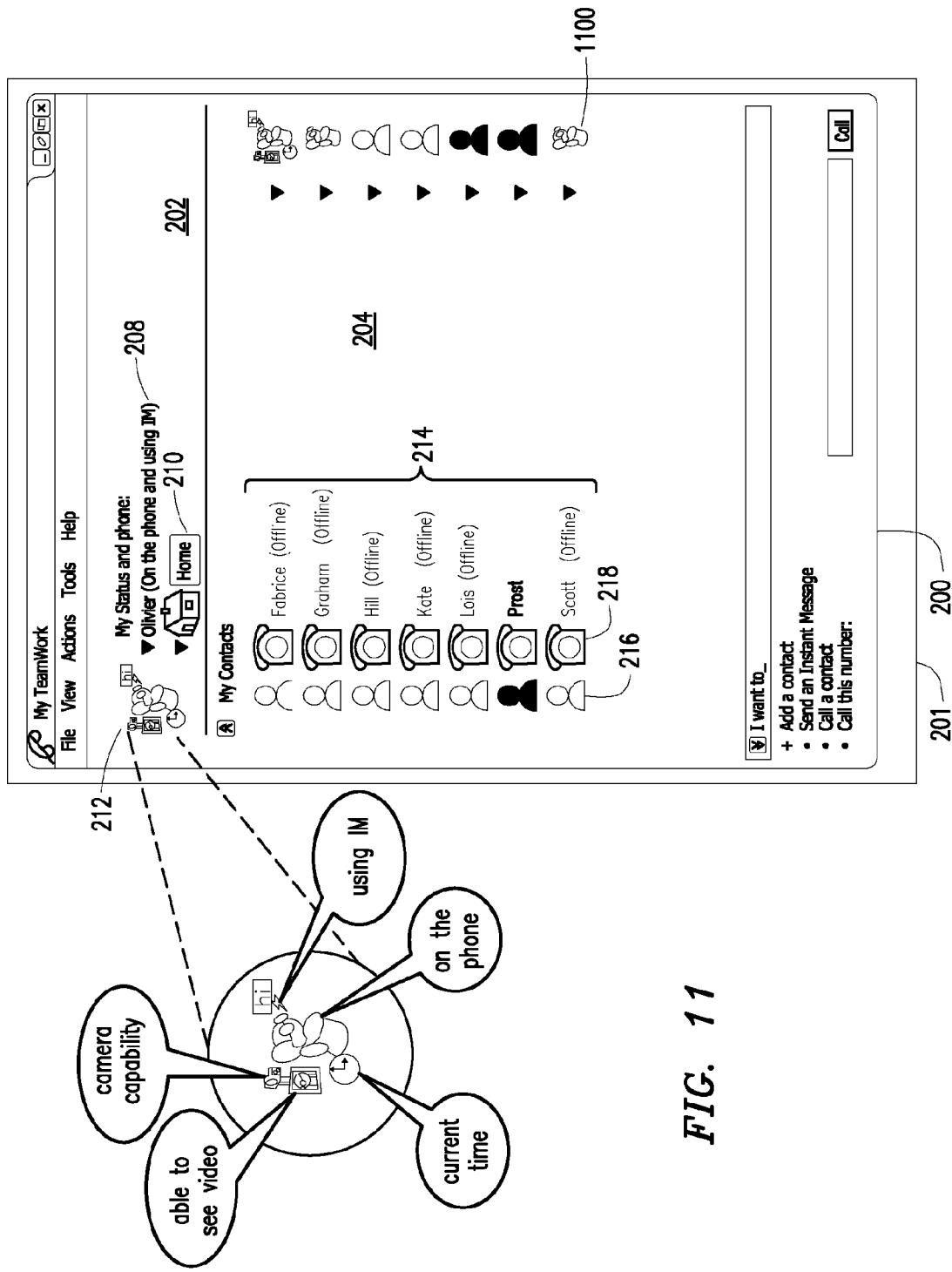
FIG. 11 illustrates a contact list page including a representation of presentity presence states for each contact in the contact list as displayed on a communications device of a presentity in accordance with another embodiment.

FIG. 11 illustrates another contact list page 200 as displayed on a communications device 201 (e.g., the communications device 120c shown in FIG. 1B) of a user (presentity) in accordance with another embodiment. The contact list page 200 shown in FIG. 11 includes a representation of the presentity presence state as seen by each contact in the contact list 200. In exemplary embodiments, the communications device 201 includes the display 126 of FIG. 1B for displaying the contact list page 200, the graphical user interface 124 of FIG. 1B for enabling the user to change information displayed on the contact list page 200 (e.g., change views and/or invoke an action to change presence and/or preference information with the presence system) and the presence user client 122 of FIG. 1B for receiving presence information from the presence system for display on the display 126 and communicating any changes made to the presence and/or preference information via the graphical user interface 124 to the presence system.

Referring again to FIG. 11, the contact list page 200 includes the user status section 202 and the contact status section 204. The user status section 202 again includes the name 208 of the user, contact information 210 for the user, and a user presence icon 212, the appearance of which corresponds to the actual, complete presence state of the user. For example, in the embodiment illustrated in FIG. 11, the user presence icon 212 visually indicates that the user is currently on the phone and using instant messaging (IM). In addition, the user presence icon 212 visually indicates that the user has camera capabilities, that the user is able to see video and the current time of the user.

The contact status section 204 again includes a contact list 214 comprising the names of one or more contacts or contact groups, which may also be watchers of the user. The term "contact" will hereinafter be used to refer to an individual contact or watcher, as well as a contact group or watcher group. Each name in the list 214 has associated therewith a contact presence icon 216, the appearance of which corresponds to the presence state of the contact as presented to one or more watchers, one of which is the user. For example, in the embodiment illustrated in FIG. 11, the contact presence icon 216 is a first color if the presence state of the contact with which it is associated is ONLINE (or AVAILABLE) and a second color if the presence state of the contact with which it is associated is OFFLINE (or UNAVAILABLE).

Each contact in the contact list 214 also has associated therewith the contact information type icon 218 that indicates the type of phone number that is provided for the associated contact. The contact information type icon 218 indicates whether the phone number provided for the contact is a home number, an office number, a mobile number, or some other type of number.

As further illustrated in FIG. 11, in accordance with another embodiment, the user status section 202 further includes a contact presentity presence state icon 1100 for each contact that visually represents the respective presentity presence state provided to each contact on the contact list 214. The presentity presence state indicates the availability of the user as seen by each contact on the contact list 214.

For example, the appearance of the contact presentity presence state icon 1100 associated with a contact for which the user has enabled that contact to see the actual, complete presence state of the user will be identical to the user presence icon 212 in the user status section 202. As an example, the contact presentity presence state icon 1100 associated with the contact Fabrice is the same as the user presence icon 212. Therefore, the user, Olivier, has set the preferences for Fabrice to allow Fabrice to see the actual, complete presence state of Olivier.

However, the appearance of the contact presentity presence state icon 1100 associated with a contact for which the user has enabled that contact to see only a partial presence state (or no presence state) of the user will be different from the user presence icon 212 in the user status section 202 and will visually represent only the particular presentity presence state that the user has allowed that contact to see. For example, the contact presentity presence state icon 1100 associated with the contact Graham indicates that Graham only sees that Olivier is "on the phone" and online. As another example, the contact presentity presence state icon 1100 associated with the contact Hill indicates that Hill only sees that Olivier is OFFLINE (or UNAVAILABLE), although Olivier is not actually offline. As a further example, the contact presentity presence state icon 1100 associated with the contact Lois indicates that Lois only sees that Olivier is ONLINE (or AVAILABLE).

Visually representing the presentity presence state for each contact in the contact list 214 allows Olivier to control from whom he may expect to receive communications requests. For example, Hill and Kate see that Olivier is OFFLINE, and therefore, it will be less likely for Olivier to receive communications requests (e.g., via phone, IM, etc.) from Hill or Kate. On the other hand, Graham sees that Olivier is "on the phone" and therefore, Graham may prefer to send an instant message to Olivier instead of calling him.

In FIG. 11, the presentity presence state is represented as a combination of icons. The icons can be standard icons provided by the presence server or customized icons that are customizable by the user, administrator and/or presence server. However, in other embodiments, the presentity presence state can be represented as a combination of text and icons, only as text or in another manner (e.g., bold-face text, italicized text, etc.). In addition, each icon 1100 may represent a link to the preference rules (filters) for that contact to enable the user to change the presentity presence state seen by that contact. In another embodiment, the user may be able to change the presentity presence state for a particular contact using a drop-down menu or other similar type of tool displayed on the contact list page 200.

Figure 12:
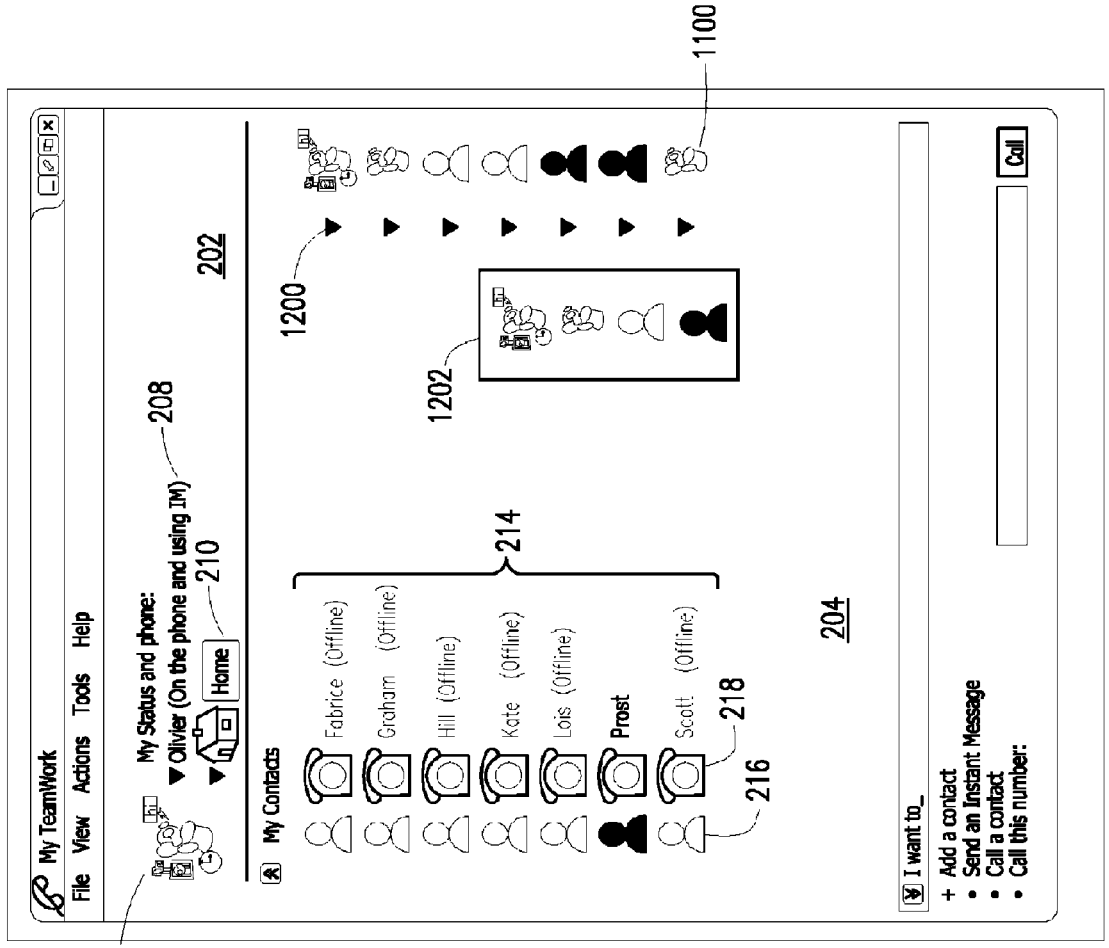
FIG. 12 illustrates a drop-down menu for changing the presentity presence state for a contact in the contact list of FIG. 11 in accordance with embodiments of the present invention.

Referring now to FIG. 12, there is illustrated a drop-down menu for changing the presentity presence state for a contact in the contact list 214 of FIG. 11 in accordance with embodiments of the present invention. As shown in FIG. 12, the user can change the presentity presence state as seen by a particular contact by clicking on an arrow 1200 next to the contact presentity presence icon 1100 associated with that contact, which results in the display of a menu 1202. Using the menu 1202, the user can select any one of a number of different presentity presence state options. For example, the illustrated options include a number of different contact presentity presence state icons, each representing a different presence state of the user.

Although not shown in FIG. 12, it should be understood that the presentity presence state as seen by a particular contact can also be changed by modifying the preference information and filters corresponding to that particular contact directly via a web page or tools page which can be accessed directly from the contact list.

Selection of a different presentity presence state option results in a change of appearance of the contact presentity presence state icon 1100 for that contact. As a result, the appearance of each of the icons 1100 associated with each of the contacts is automatically updated when a change occurs. In addition, once the user makes a change to the presentity presence state seen by a particular contact, the presence user client (e.g., PUC 122 shown in FIG. 1B) running on the communications device 201 communicates with the presence system to update the presentity presence state provided by the presence system to that particular contact.

Figure 13:
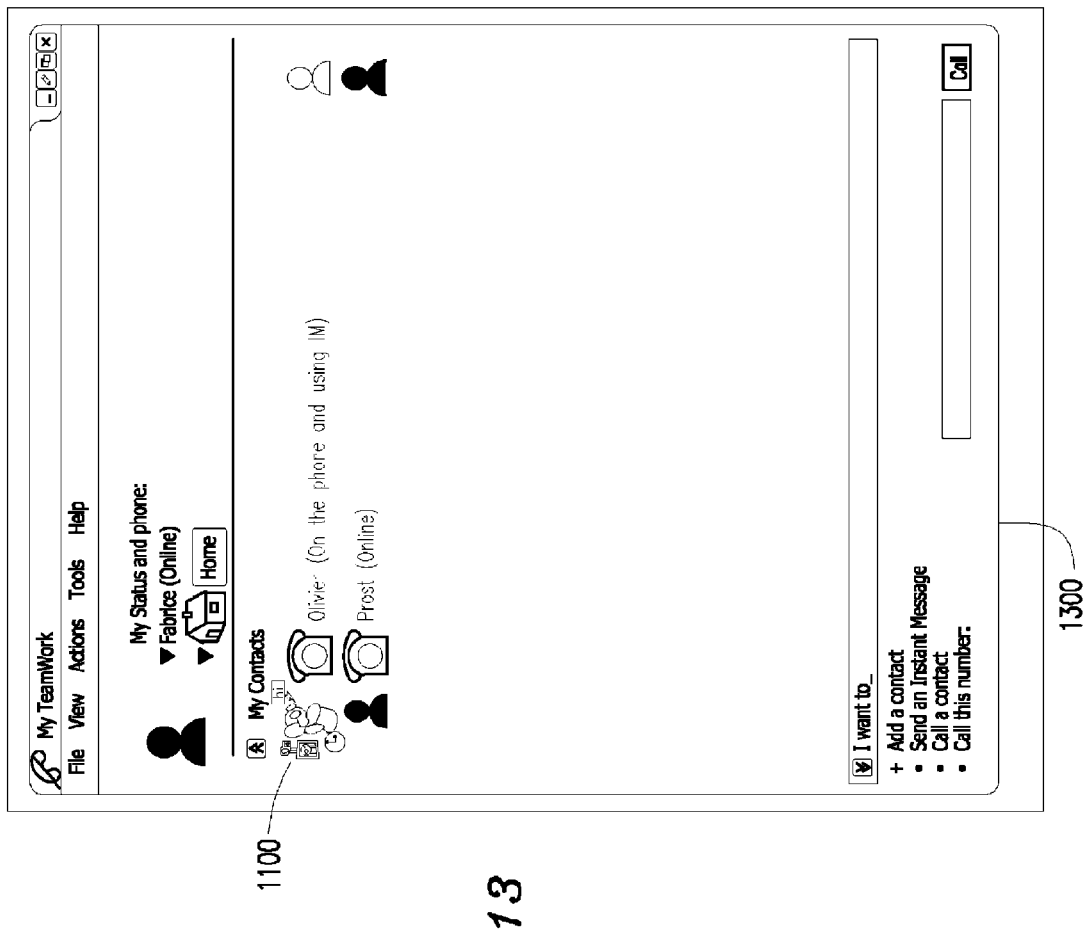
FIG. 13 illustrates another contact list page that displays the presence state of the presentity as set in FIG. 11.

For example, referring now to FIG. 13, there is illustrated the contact list page 1300 of Fabrice. As can be seen in FIG. 13, the fact that Olivier has set the preference rules (filters) in Olivier's contact list such that Fabrice is allowed to see the actual, complete presentity presence state of Olivier is reflected by the appearance of the icon 1100, which indicates to Fabrice that Olivier is currently on the phone and using instant messaging (IM), that Olivier has camera capabilities and is able to see video and the current time where Olivier is located.

As stated above, once the user makes a change to the presentity presence state seen by a particular contact, the presence user client (e.g., PUC 122 shown in FIG. 1B) associated with the user communicates with the presence system to update the presentity presence state provided by the presence system to that particular contact. In preferred embodiments, the PUC updates the presence system by modifying preference information associated with that contact that is maintained by the presence system.

Figure 14A:
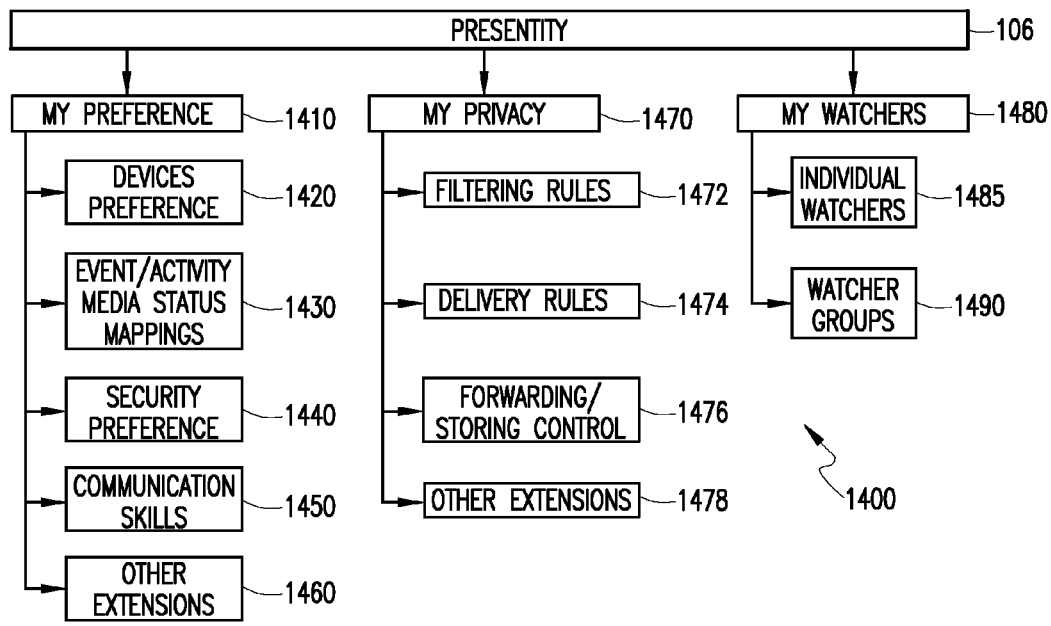
FIG. 14A illustrates an exemplary preference data structure for a presentity, in accordance with embodiments of the present invention.

Referring now to FIG. 14A, there is illustrated an exemplary preference data structure 1400 for storing preference information, in accordance with embodiments of the present invention. As described above in connection with FIG. 1B, for each presentity 106, the presence server 160 can store presentity preference information 190 relating to communications 1410, privacy 1470 and watchers 1480. Under communication preferences 1410, the presentity can enter device preferences 1420, event/activity-media status mapping preferences 1430, security preferences 1440, communication skills preferences 1450 and other types of preferences 1460.

For example, under device preferences 1420, the presentity 106 can rank his or her communications devices in order of preferred device and/or preferred device for each media type. As an example, the presentity 106 can indicate that for voice applications, the presentity 106 prefers communication sessions to be routed to the presentity's desktop phone first, and if the desktop phone is unavailable, then to the presentity's cell phone, and if both are unavailable, to the presentity's PC, followed by the presentity's PDA. However, for text applications, the presentity 106 can indicate that the presentity 106 prefers communication sessions to be routed to the presentites' PDA first, and then to the presentity's PC. In addition, for multi-media applications, the presentity 106 can indicate that the presentity 106 prefers communication sessions to be routed to the presentites' PC first, and then to the presentity's cell phone.

Media status is impacted by the presentity's currently activity. Thus, the presentity 106 can indicate the media status of one or more media types depending on the current presentity activity. Media status can be in one of the four states, i.e., Active, In-Use, Busy and Inactive. For example, when a scheduled meeting starts, a notification is sent to the presence server. Examples of event/activity-media status mapping preferences 1430 include a preference that when the presentity 106 is in a scheduled meeting, no voice communication sessions are allowed (i.e., the media status of the voice media type is "Inactive"), but text communications are allowed (i.e., the media status of the text media type is "Active").

Security preferences 1440 may also be important to the presentity 106 for particular media types and/or communication sessions with particular watchers to prevent real-time and non-real-time unauthorized access to the communication session by a third party. For example, a presentity 106 can specify the preferred supported security protocols per device, per application and per media type.

Communication skills preferences 1450 enable a presentity 106 to specify the presentity's language skills and their preference for real-time communications, per device, per application and per media type. For example, a Chinese employee presentity that is able to communicate in English, Chinese and, perhaps other languages can configure his or her language preference such that Chinese is preferred for voice applications, but English is preferred for text applications. In addition, the communication skills preferences 1450 enable a presentity 106 to indicate the maximum number of interactions (concurrent communication session) per media type before the media status enters the Busy state.

Under privacy preferences 1470, the presentity 106 can enter filtering rules 1472, delivery rules 1474, forwarding/storing control rules 1476 and other types of rules 1478. Under filtering rules 1472, the presentity 106 can enter indicate the viewing scope of the presentity's presence information per watcher and/or watcher group. For example, a presentity 106 can specify the type and amount of the presentity's presence information that is disclosed to a watcher or watcher group, as set in accordance with embodiments of the present invention.

Delivery rules 1474 enable a presentity 106 to specify the delivery mode (secured/unsecured) of his/her presence information. The delivery mode might be different for various presence attributes depending on their sensitivity. The forwarding/storing control rules 1476 equips the presentity 106 with the capability to decide whether his/her presence information is permitted to be forwarded to third parties by a watcher or a watcher group member or saved locally by a watcher or a watcher group member.

Under watcher preferences 1480, the presentity 106 can enter individual watcher preferences 1485 and watcher group preferences 1490. An individual watcher refers to an individual session initiator, while a watcher group refers to one or more session initiators belonging to a group. For example, the "Accounting Department" may be a watcher group, even if the group only has a single watcher. An individual watcher can also be included in multiple watcher groups. The members of a watcher group can be linked to their individual watcher records to avoid the redundancy and maintain the consistency of watcher information. The presentity 106 can grant priority levels to both individual watchers and watcher groups. For example, the presentity 106 can grant everyone in his department (watcher group) a specific priority, but also grant his or her boss a higher priority than the watcher group.

Figure 14B:
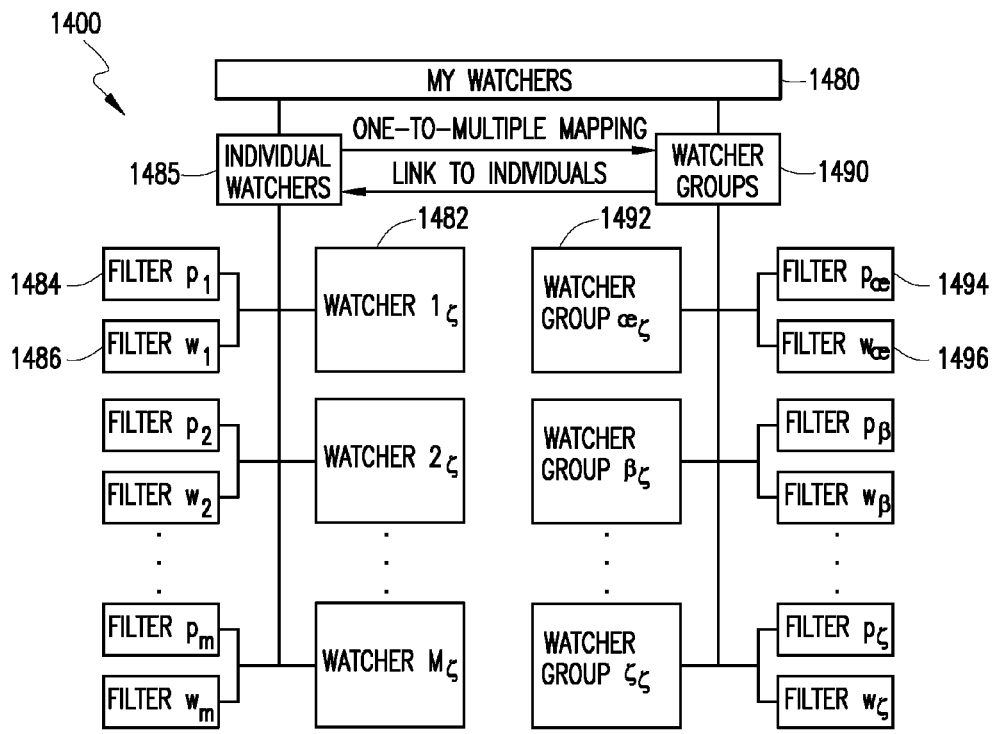
FIG. 14B illustrates an exemplary preference data structure including presentity watcher preferences that set the presentity presence state provided to each watcher, in accordance with embodiments of the present invention.

FIG. 14B illustrates an exemplary preference data structure 1400 including watcher preferences 1480 for a presentity, in accordance with embodiments of the present invention. As discussed above in connection with FIG. 14A, a presentity's watcher preferences 1480 can include both individual watcher preferences 1485 and watcher group preferences 1490. One specific type of watcher preference for individual watchers 1485 is a watcher priority level 1482 (e.g., the VIP level described above). For each watcher that subscriber to the presentity's presence information, the presentity 106 can enter a priority level 1482 for that watcher. In addition, a presentity can enter filtering rules 1484 per watcher, and a watcher can also enter filtering rules 1486 per presentity. The presentity filtering rules 1484 per watcher can be linked to the filtering rules 1472 in the privacy preferences 1470 shown in FIG. 14A to specify the type and amount of the presentity's presence information that is disclosed to the watcher, which can be based on the priority level 1482 granted to the watcher.

In addition, each watcher group 1490 can be granted a particular watcher group priority level 1492 by the presentity, which is linked to presentity filtering rules 1494 for the watcher group and watcher group filtering rules 1496 for the watcher group. For example, a watcher group's filtering rules 1494 can be configured by the owner of the group, or alternatively, can include default filtering rules determined from the union of all the filtering rules of its members who are already watchers of the presentity. In addition, a presentity can configure his or her filtering rules 1494 for each watcher group, or, alternatively, the presentity's filtering rules 1494 for a watcher group can include default filtering rules determined from the intersection of all the filtering rules the presentity has already configured for the members who are the presentity's watchers.

In the same way, the watcher group priority level 1492 can be configured by the presentity, or, alternatively, determined from the priority levels granted to the individual watchers in the watcher group. For example, in one embodiment, the watcher group priority level 1492 can be the lowest priority level granted to the individual watchers in the group. In another embodiment, the watcher group priority level 1492 can be the highest priority level granted the individual watchers in the group. In a further embodiment, the watcher priority level 1492 can be the average of the priority levels granted to the individual watchers in the group.

Figure 15:
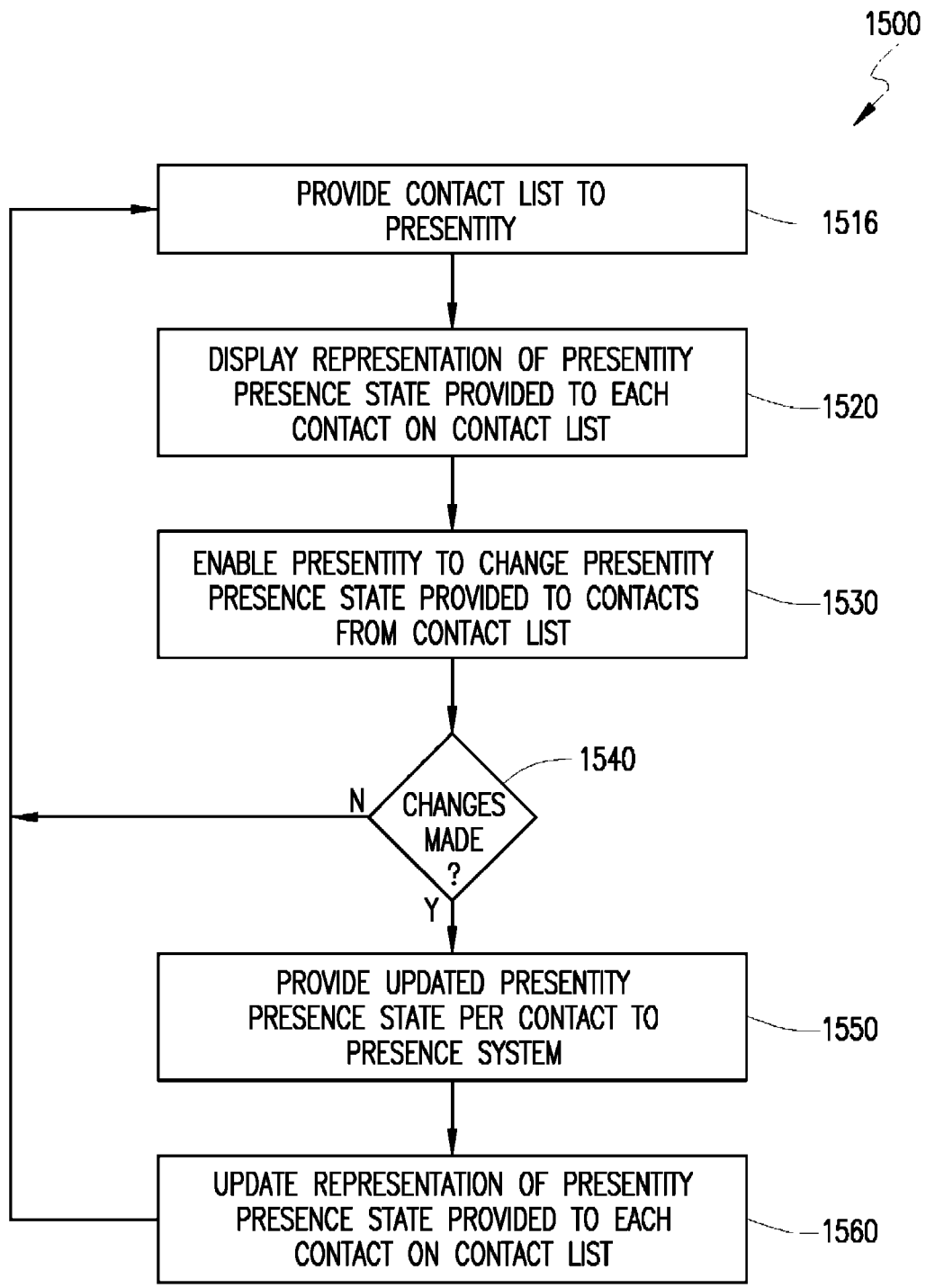
FIG. 15 is a flowchart illustrating an exemplary process for representing a presence state of a presentity as provided to each contact on a contact list thereof, in accordance with embodiments of the present invention.

FIG. 15 is a flowchart illustrating an exemplary process 1500 for representing a presence state of a presentity as provided to each contact on a contact list thereof, in accordance with embodiments of the present invention. At block 1510, the presentity is provided with a contact list including one or more contacts who are watchers of the presentity within a presence system. The contact list can be displayed to the presentity on a contact list page, as described above. In addition, at block 5120, on the contact list page, there is further displayed a representation of a respective presentity presence state for each contact on that contact list. Each of the displayed representations of the presentity presence states indicates an availability of the presentity as provided by the presence system to the respective contacts on the contact list. For example, in one embodiment, each representation of the presentity presence state is visually depicted on the contact list as a respective contact presentity presence icon for each contact, in which each icon visually indicates the presentity presence state provided to the associated contact.

At block 1530, the presentity is provided with the ability to change the respective presentity presence state provided to each said contact on the contact list from the contact list itself. If, at block 1540, the presentity makes a change to the presentity presence state provided to one or more contacts on the contact list, at block 1550, the presence system is updated with the new presentity presence state to be provided by the presence system to each contact on the contact list whose associated presentity presence state is changed by the presentity. In addition, at block 1560, the appearance of the representation of the presentity presence state is changed on the contact list page for each contact on the contact list whose associated presentity presence state is changed by the presentity.

As will be recognized by those skilled in the art, the innovative concepts described in the present application can be modified and varied over a wide range of applications. Accordingly, the scope of patents subject matter should not be limited to any of the specific exemplary teachings discussed, but is instead defined by the following claims.

We claim:

1. A communications device associated with a presentity, comprising:
    a presence user client communicatively coupled to a presence system via a communication network to receive presence information associated with said presentity, said presence information including a respective presentity presence state indicating a respective availability of said presentity as provided by said presence system to each contact on a contact list of said presentity, in which at least one said contact is a watcher of said presentity; and a display coupled to said presence user client for displaying to said presentity said contact list of said presentity and, adjacent to each said contact in said contact list, a respective representation of said respective presentity presence state as seen by said respective contact on said contact list.

2. The device of claim 1, further comprising:
a graphical user interface coupled to said presence user client and said display for enabling a user of said device to change said respective presentity presence state provided to each said contact on said contact list from said contact list.

3. The device of claim 2, wherein said graphical user interface displays on said display a respective contact presentity presence icon for each said contact on said contact list, each said respective contact presentity presence icon visually indicating said respective presentity presence state provided to said respective contact on said contact list.

4. The device of claim 3, wherein said graphical user interface further displays on said display a respective menu associated with each said contact presentity presence icon, each said menu including a list of available presentity presence states that can be provided to said respective contact associated with said respective contact presentity presence icon, and wherein said graphical user interface further enables said user to select a select one of said presentity presence states from said respective menu for each said contact in said contact list.

5. The device of claim 4, wherein said list of available presentity presence states for each said contact is displayed as a list of available contact presentity presence icons for said respective contact.

6. The device of claim 4, wherein said graphical user interface further displays on said display a respective arrow for each of said contact presentity presence icons, and wherein the selection of a selected one of said arrows causes said graphical user interface to display said respective menu for said contact presentity presence icons associated with selected arrow.

7. The device of claim 2, wherein said graphical user interface updates an appearance of said representation of said presentity presence state on said display for each said contact on said contact list whose associated presentity presence state is changed by said user.

8. The device of claim 2, wherein said graphical user interface further displays on said display a presentity presence icon that visually represents an actual presence state of said presentity indicating an actual availability of said presentity, each said representation of said presentity presence state representing either a portion of said actual presence state of said presentity or no presence state of said presentity.

9. The device of claim 2, wherein said presence user client is in communication with said presence system to update said presentity presence state provided by said presence system to each said contact on said contact list whose associated presentity presence state is changed by said user.

10. The device of claim 9, wherein said presence user client operates to update said presentity presence state provided by said presence system to a select one of said contacts by modifying preference information associated with said select contact that is maintained by said presence system.

11. A presence system, comprising:
a presence server coupled to a communication network to receive and maintain presence information associated with a presentity, said presence information defining an actual presence state of said presentity indicating an actual availability of said presentity, said presence server further maintaining preference information associated with said presentity, said preference information identifying a respective presentity presence state that indicates a respective availability of said presentity provided by said presence server to each contact on a contact list of said presentity, in which at least one said contact is a watcher of said presentity; and a communications device associated with said presentity for displaying to said presentity said contact list of said presentity and, adjacent to each said contact in said contact list, a respective representation of said respective presentity presence state as seen by said respective contact on said contact list.

12. The presence system of claim 1, wherein said communications device is further operable to enable a user of said communications device to change said respective presentity presence state provided by said presence server to each said contact on said contact list.

13. The presence system of claim 12, wherein said communications device is further operable to update an appearance of said representation of said presentity presence state for each said contact on said contact list whose associated presentity presence state is changed by said user.

14. The presence system of claim 12, wherein said communications device is further operable to display a presentity presence icon that visually represents said actual presence state of said presentity, each said representation of said presentity presence state representing either a portion of said actual presence state of said presentity or no presence state of said presentity.

15. The presence system of claim 12, wherein said presence server updates said presentity presence state provided to a select one of said contacts by modifying said preference information associated with said select contact.

16. The presence system of claim 11, further comprising:
an additional communications device associated with one of said watchers of said presentity for displaying said presentity presence state of said presentity based on said preference information associated with said presentity.

17. A method for representing a presence state of a presentity as provided to each contact on a contact list thereof, comprising the steps of:
providing a contact list including one or more contacts who are watchers of a presentity associated with a presence system;
displaying to said presentity said contact list of said presentity, and adjacent to each contact in said contact list, a respective representation of a respective presentity presence state as seen by said respective contact on said contact list, each said presentity presence state being maintained by said presence system and indicating an availability of said presentity as provided by said presence system to said respective contact on said contact list;
enabling said presentity to change said respective presentity presence state provided to each said contact on said contact list from said contact list; and
updating an appearance of said representation of said presentity presence state for each said contact on said contact list whose associated presentity presence state is changed by said presentity.

18. The method of claim 17, wherein said displaying further comprises the step of:

displaying a respective contact presentity presence icon for each said contact on said contact list, each said respective contact presentity presence icon visually indicating said respective presentity presence state provided to said respective contact on said contact list.

19. The method of claim 18, further comprising the step of: displaying a presentity presence icon that visually represents an actual presence state of said presentity indicating an actual availability of said presentity.

20. The method of claim 17, further comprising the step of: updating said presence system with said presentity presence state to be provided by said presence system to each said contact on said contact list whose associated presentity presence state is changed by said presentity.

* * * * *